(12) United States Patent
Sugiura et al.

(10) Patent No.: US 8,616,061 B2
(45) Date of Patent: Dec. 31, 2013

(54) ULTRASONIC SENSOR

(75) Inventors: Makiko Sugiura, Hekinan (JP); Yasuyuki Okuda, Aichi-gun (JP); Takaaki Kawai, Obu (JP); Takahiko Yoshida, Okazaki (JP); Hisanaga Matsuoka, Okazaki (JP); Toshiki Isogai, Nagoya (JP); Mitsuyasu Matsuura, Chiryu (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 13/425,460

(22) Filed: Mar. 21, 2012

(65) Prior Publication Data

US 2012/0174673 A1     Jul. 12, 2012

Related U.S. Application Data

(62) Division of application No. 12/385,714, filed on Apr. 16, 2009, now Pat. No. 8,166,824.

(30) Foreign Application Priority Data

| Apr. 18, 2008 | (JP) | 2008-108465 |
| Apr. 22, 2008 | (JP) | 2008-111507 |

(51) Int. Cl.

| G01N 29/32 | (2006.01) |
| G01S 3/82  | (2006.01) |
| G08G 1/14  | (2006.01) |
| G08G 1/04  | (2006.01) |
| G01N 29/44 | (2006.01) |

(52) U.S. Cl.
USPC ............ 73/602; 73/617; 340/932.2; 340/943; 367/152; 367/124; 367/129

(58) Field of Classification Search
USPC .............. 73/29.01, 1.82, 1.86, 602, 617, 619, 73/630, 644; 340/870.16, 932.2, 943; 367/152, 124, 129
See application file for complete search history.

(56) References Cited

U.S. PATENT DOCUMENTS

3,343,167 A * 9/1967 Rademacher ................. 367/93
3,521,090 A   7/1970 Angeloff
(Continued)

FOREIGN PATENT DOCUMENTS

| DE | 37 21 213 A1     | 1/1989 |
| DE | 10 2004 038 496  | 3/2006 |

(Continued)

OTHER PUBLICATIONS

Office Action issued from the Japanese Patent Office mailed on Jan. 12, 2010 in the corresponding Japanese patent application No. 2008-111507 (with English translation).

(Continued)

*Primary Examiner* — Peter Macchiarolo
*Assistant Examiner* — Rose M Miller
(74) *Attorney, Agent, or Firm* — Posz Law Group, PLC

(57) ABSTRACT

An ultrasonic sensor includes a transmitting device, a receiving device, and a circuit device. The circuit device determines that the receiving device receives an ultrasonic wave reflected from an object, when an output voltage of the receiving device is equal to or greater than a first threshold. The circuit device includes a humidity detection section configured to detect an ambient humidity of the transmitting and receiving devices and a threshold adjustment section configured to calculate, based on the detected ambient humidity, a sound pressure of the ultrasonic wave that is received by the receiving device after propagating over a round-trip distance between the ultrasonic sensor and the object. The threshold adjustment section reduces the first threshold, when the output voltage corresponding to the calculated sound pressure is less than a second threshold that is greater the first threshold.

8 Claims, 14 Drawing Sheets

(56) References Cited

U.S. PATENT DOCUMENTS

| | | | |
|---|---|---|---|
| 4,581,726 A * | 4/1986 | Makino et al. | 267/99 |
| 4,759,775 A | 7/1988 | Peterson et al. | |
| 5,435,827 A | 7/1995 | Wisell | |
| 5,907,521 A | 5/1999 | Matsui et al. | |
| 6,324,889 B1 | 12/2001 | Fluhrer | |
| 6,685,657 B2 | 2/2004 | Jones | |
| 8,020,447 B2 | 9/2011 | Okuda et al. | |
| 2006/0032295 A1 | 2/2006 | Hazelden et al. | |
| 2006/0196272 A1 | 9/2006 | Sugiura et al. | |
| 2007/0157728 A1 | 7/2007 | Endou | |
| 2008/0083282 A1 | 4/2008 | Okuda | |
| 2009/0107243 A1 | 4/2009 | Sugiura et al. | |
| 2009/0249878 A1 * | 10/2009 | Faber et al. | 73/627 |

FOREIGN PATENT DOCUMENTS

| | | |
|---|---|---|
| DE | 10 2005 038 649 | 2/2007 |
| JP | A-S62-015476 | 1/1987 |
| JP | A-63-103993 | 5/1988 |
| JP | A-H04-054800 | 2/1992 |
| JP | A-07-46867 | 2/1995 |
| JP | A-2004-347369 | 12/2004 |
| JP | A-2006-3124 | 1/2006 |

OTHER PUBLICATIONS

Office Action issued from the Japan Patent Office mailed on May 11, 2010 in the corresponding Japanese patent application No. 2008-108465 (with English translation).

Office Action issued from the German Patent Office dated Oct. 8, 2010 in the corresponding German patent application No. 10 2009 017 507.5-55 (with English translation).

Office Action mailed Aug. 1, 2011 in corresponding German application No. 10 2009 061 087.1 (and English translation).

* cited by examiner

ULTRASONIC SENSOR

CROSS REFERENCE TO RELATED APPLICATION

This application is a divisional of U.S. application Ser. No. 12/385,714 filed on Apr. 16, 2009, allowed on Dec. 29, 2011, which is based on and claims priority to Japanese Patent Application No. 2008-108465 filed on Apr. 18, 2008 and No. 2008-111507 filed on Apr. 22, 2009, the disclosures of which are incorporated herein by reference.

FIELD OF THE INVENTION

The present invention relates to an ultrasonic sensor including transmitting and receiving devices, each of which has a piezoelectric element and an acoustic matching member joined to the piezoelectric element.

BACKGROUND OF THE INVENTION

An ultrasonic sensor disclosed in US 2006/0196272 corresponding to JP-A-2006-242650 includes one transmitting device and four receiving devices.

When an alternating voltage is applied to an electrode film on a membrane portion, the membrane portion and the electrode film resonate at a predetermined frequency so that the transmitting device transmits an ultrasonic wave. The ultrasonic wave is reflected from an object to be detected and received by each receiving device. The receiving devices output signals corresponding to the received ultrasonic waves. A distance and an angle of the object relative to the ultrasonic sensor is calculated based on differences in time and phase between the output signals of the receiving devices.

By the way, when an ambient humidity changes, the ultrasonic wave transmitted by the transmitting device is attenuated. Thus, a sound pressure of the ultrasonic wave received by the receiving devices changes with the ambient humidity. In the ultrasonic sensor disclosed in US 2006/0196272, the transmitting device transmits ultrasonic waves having two different frequencies, and the humidity is calculated based on a difference in attenuation coefficient between the ultrasonic waves. The calculated humidity is used to correct a preset operating humidity. However, when the ultrasonic sensor includes an acoustic matching member, it may be difficult to accurately detect the humidity.

An ultrasonic sensor disclosed in JP-A-S63-103993 includes an acoustic matching member. The acoustic matching member has a microballoon made of glass inside so that variations in characteristics of the acoustic matching member due to a temperature change can be reduced. However, some factors such as the size and the strength of the acoustic matching member may make it difficult to place such a microballoon inside the acoustic matching member.

SUMMARY OF THE INVENTION

In view of the above, it is an object of the present invention to provide an ultrasonic sensor for preventing a reduction in transmitting and receiving sensitivities due to a humidity change or a temperature change.

According to an aspect of the present invention, an ultrasonic sensor includes a transmitting device, a receiving device, and a circuit device. The transmitting device transmits an ultrasonic wave to an object to be detected. The transmitting device includes a first piezoelectric element configured to emit the ultrasonic wave and a first acoustic matching member though which the emitted ultrasonic wave propagates to an outside. The receiving device receives the ultrasonic wave reflected from the object. The receiving device includes a second piezoelectric element configured to detect the reflected ultrasonic wave and produce an output voltage corresponding to the detected ultrasonic wave. The receiving device further includes a second acoustic matching member though which the reflected ultrasonic wave propagates to the second piezoelectric element. The circuit device applies a voltage to the first piezoelectric element to cause the first piezoelectric element to emit the ultrasonic wave. The circuit device determines that the receiving device receives the reflected ultrasonic wave, when the output voltage of the second piezoelectric element is equal to or greater than a first threshold voltage. The circuit device includes a humidity detection section and a threshold adjustment section. The humidity detection section detects an ambient humidity of the transmitting and receiving devices. The threshold adjustment section calculates, based on the detected ambient humidity, a sound pressure of the ultrasonic wave that is received by the receiving device after propagating over a round-trip distance between the ultrasonic sensor and the object. The threshold adjustment section reduces the first threshold voltage, when the output voltage corresponding to the calculated sound pressure is less than a second threshold voltage. The second threshold voltage is greater the first threshold voltage.

According to another aspect of the present invention, an ultrasonic sensor includes a transmitting device, a receiving device, and a circuit device. The transmitting device transmits an ultrasonic wave to an object to be detected. The transmitting device includes a first piezoelectric element configured to emit the ultrasonic wave and a first acoustic matching member though which the emitted ultrasonic wave propagates to an outside. The receiving device receives the ultrasonic wave reflected from the object. The receiving device includes a second piezoelectric element configured to detect the reflected ultrasonic wave and produce an output voltage corresponding to the detected ultrasonic wave. The receiving device further includes a second acoustic matching member though which the reflected ultrasonic wave propagates to the second piezoelectric element. The circuit device applies a voltage of a frequency to the first piezoelectric element to cause the first piezoelectric element to emit the ultrasonic wave of the frequency. The circuit device includes a resonance frequency detection section configured to detect a resonance frequency of one of the first and second acoustic matching members. The circuit device adjusts the frequency of the voltage to the detected resonance frequency.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1A:
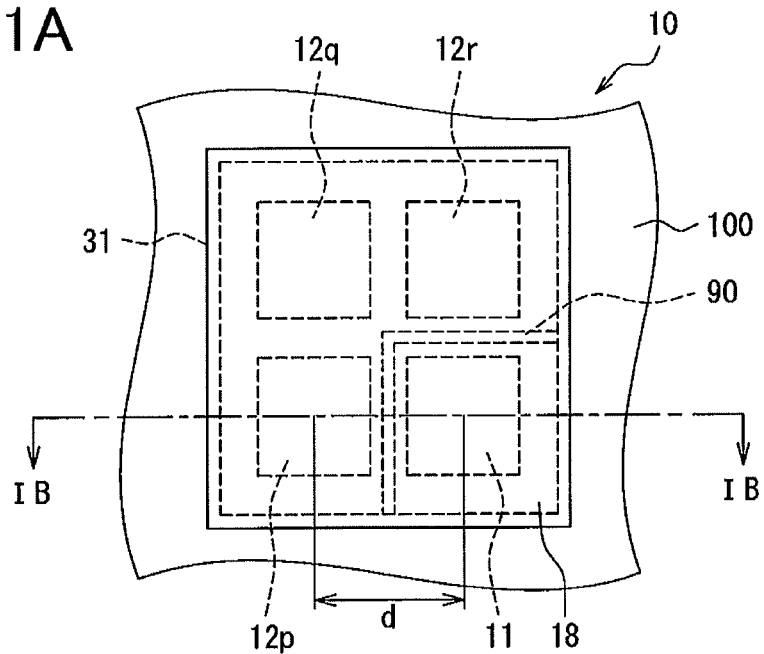
FIG. 1A is a diagram illustrating a top view of an ultrasonic sensor according to a first embodiment of the present invention.
Figure 1B:
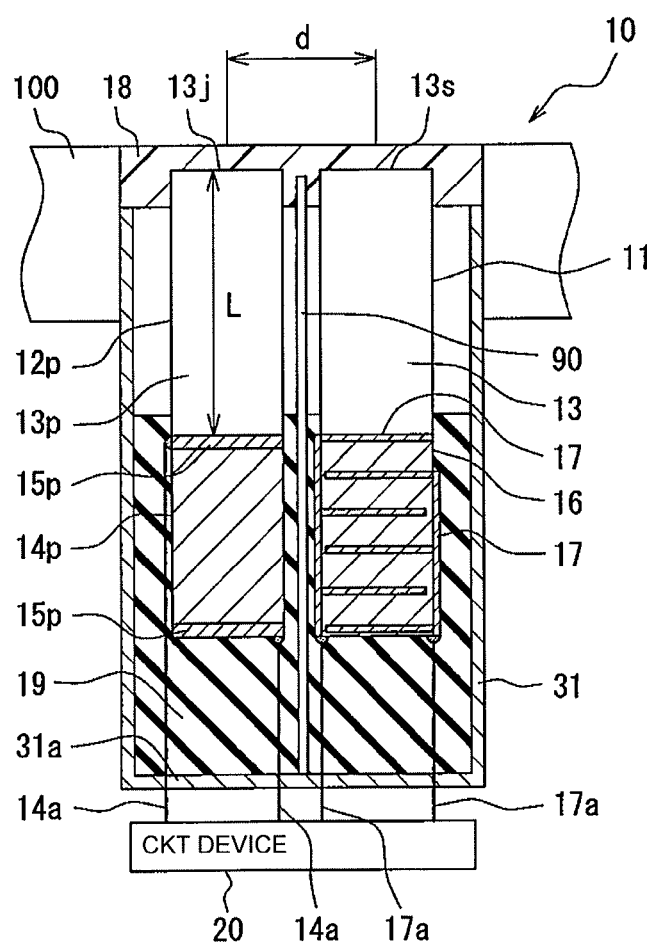
FIG. 1B is a diagram illustrating a cross-sectional view taken along line IB-IB in FIG. 1A.
Figure 2:
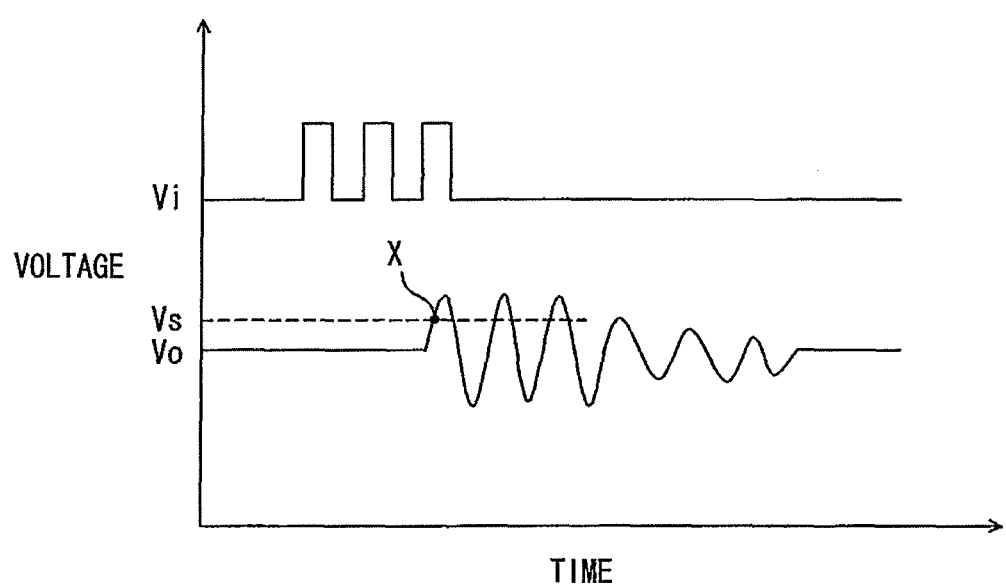
FIG. 2 is a diagram illustrating a relationship between an output voltage of a piezoelectric element of a receiving device and a threshold voltage.

An ultrasonic sensor 10 according to a first embodiment of the present invention is described below with reference to FIGS. 1A and 1B. For example, the ultrasonic sensor 10 can be used as an obstacle sensor mounted on a vehicle. The lower side of FIG. 1A is directed to the ground, and the upper side of FIG. 2 is directed to an outside of the vehicle.

The ultrasonic sensor 10 includes a transmitting device 11, receiving devices 12p, 12q, 12r, a vibration damper 18, a first absorber 19, a vibration isolator 90, a circuit device 20, and a housing 31. The transmitting device 11 transmits an ultrasonic wave. The receiving devices 12p, 12q, 12r detect the ultrasonic wave reflected from an object (i.e., obstacle) to be detected. The vibration damper 18 prevents propagation of the ultrasonic wave among the transmitting device 11 and the receiving devices 12p, 12q, and 12r. The first absorber 19 protects the transmitting device 11 and the receiving devices 12p, 12q, and 12r from external force (impact). The vibration isolator 90 isolates the transmitting device 11 from the receiving devices 12p, 12q, 12r to prevent propagation of the ultrasonic wave from the transmitting device 11 to the receiving devices 12p, 12q, and 12r. The circuit device 20 transmits and receives voltage signals related to transmission and reception of the ultrasonic wave. The housing 31 is shaped like a box having an opening. The transmitting device 11, the receiving devices 12p, 12q, and 12r, the vibration damper 18, the first absorber 19, and the vibration isolator 90 are held in the housing 31.

Since the receiving devices 12p, 12q, and 12r are identical in structure, a structure of the receiving device 12p is explained below as an example. The receiving device 12p includes an acoustic matching member 13p and a piezoelectric element 14p joined to the acoustic matching member 13p. The acoustic matching member 13p receives the ultrasonic wave reflected from the object and carries the ultrasonic wave to the piezoelectric element 14p. The piezoelectric element 14p detects the ultrasonic wave.

For example, the piezoelectric element 14p can be made of piezoelectric zirconate titanate (PZT) or the like. The piezoelectric element 14p includes a piezoelectric body and a pair of electrodes 15p. The piezoelectric body has a rectangular cylindrical shape and is identical in cross-section to the acoustic matching member 13p. The electrodes 15p are formed on opposite surfaces of the piezoelectric body. Thus, the piezoelectric element 14p is formed such that the piezoelectric body is sandwiched between the electrodes 15p. For example, the electrodes 15p can be formed by plating or sputtering of platinum (Pt), copper (Cu), or silver (Ag) or by baking of conductive paste.

The acoustic matching member 13p is made of a material having an acoustic impedance that is greater than an acoustic impedance of air and less than an acoustic impedance of the piezoelectric element 14p. For example, the acoustic matching member 13p can be made of a high durability resin material such as a polycarbonate resin.

A thickness L of the acoustic matching member 13p is substantially equal to one-quarter of a wavelength λ of the ultrasonic wave in the acoustic matching member 13p. In such an approach, a standing wave is produced in the acoustic matching member 13p. Therefore, interference and cancellation between the ultrasonic wave entering the acoustic matching member 13p and the ultrasonic wave reflected at an interface between the acoustic matching member 13p and the piezoelectric element 14p can be reduced. As a result, the ultrasonic wave entering the acoustic matching member 13p can efficiently propagate to the piezoelectric element 14p. It is preferable that a width W of the acoustic matching member 13p be substantially equal to or less than one-half of a wavelength of the ultrasonic wave in air.

The transmitting device 11 includes an acoustic matching member 13 and a multilayer piezoelectric element 16 joined to the acoustic matching member 13. The acoustic matching member 13 can be made of the same material as the acoustic matching member 13p and have the same structure as the acoustic matching member 13p.

For example, the multilayer piezoelectric element 16 can be made of piezoelectric zirconate titanate (PZT) or the like. The multilayer piezoelectric element 16 includes a piezoelectric body and a pair of comb electrodes 17. The piezoelectric body has a rectangular cylindrical shape and is identical in cross-section to the acoustic matching member 13. The comb electrodes 17 are formed to the piezoelectric body such that piezoelectric layers are interleaved with electrode layers. In the first embodiment, the multilayer piezoelectric element 16 has five layers. The number of layers can vary according to pressure of the ultrasonic wave to be transmitted.

The electrodes 15p of the piezoelectric element 14p are electrically coupled to the circuit device 20 through wires 14a, respectively. The comb electrodes 17 of the multilayer piezoelectric element 16 are electrically coupled to the circuit device 20 through wires 17a, respectively. The circuit device 20 is electrically coupled to an electronic control unit (ECU) mounted on the vehicle. The ECU is not shown in the drawings.

When the ultrasonic sensor 10 transmits the ultrasonic wave, the circuit device 20 receives from the ECU a control signal that controls pressure and phase of the ultrasonic wave to be transmitted. Based on the control signal, the circuit device 20 outputs a voltage signal (i.e., applies a voltage) of a predetermined frequency to the multilayer piezoelectric element 16 so that the multilayer piezoelectric element 16 can transmit the ultrasonic wave of the predetermined frequency. The circuit device 20 compares an output voltage of each piezoelectric element 14p with a threshold voltage Vs in order to detect whether the ultrasonic wave is received. If the output voltage of the piezoelectric element 14p is equal to or greater than the threshold voltage Vs, the circuit device 20 determines that the ultrasonic wave is received and outputs to the ECU a vibration signal corresponding to the output voltage.

The ultrasonic wave detection performed by the circuit device 20 is described below with reference to FIG. 2. FIG. 2 illustrates a relationship between an output voltage Vo of the piezoelectric element 14p and the threshold voltage Vs.

When the circuit device 20 applies an input voltage Vi of a predetermine frequency to the multilayer piezoelectric element 16, the multilayer piezoelectric element 16 transmits an ultrasonic wave of the predetermined frequency. The transmitted ultrasonic wave is reflected from an object and received by each piezoelectric element 14p. The piezoelectric element 14p produces the output voltage Vo corresponding to a sound pressure of the received ultrasonic wave. When the output voltage Vo becomes equal to or greater than the threshold voltage Vs as indicated by a point X in FIG. 2, the circuit device 20 determines that the piezoelectric element 14p receives the ultrasonic wave. The threshold voltage Vs is sufficiently greater than a voltage caused by noise in order to avoid incorrect detection of the ultrasonic wave.

The acoustic matching member 13 of the transmitting device 11 and the acoustic mating members 13p of the receiving devices 12p-12r are arranged in an array pattern through the vibration damper 18. It is preferable that a distance d between centers of adjacent acoustic matching members 13, 13p be substantially equal to one-half of the wavelength of the ultrasonic wave. Alternatively, the distance d can be different (e.g., greater) than one-half of the wavelength of the ultrasonic wave.

The vibration damper 18 is fixed to the opening of the housing 31 to cover receiving surfaces 13j of the acoustic matching members 13p and a transmitting surface 13s of the acoustic matching member 13. That is, the receiving surfaces 13j and the transmitting surface 13s are not exposed to an outside of the housing 31. The vibration damper 18 prevents foreign matters such as water and dust from entering inside the housing 31. Thus, the vibration damper 18 improves reliability of the ultrasonic sensor 10. The housing 31 is mounted to the vehicle such that the acoustic matching members 13, 13p can face the outside of the vehicle. For example, the housing 31 is mounted to a bumper 100 of the vehicle.

The vibration damper 18 is made of a material that has a damping constant greater than a damping constant of each of the acoustic matching members 13, 13p and that has an acoustic impedance less than an acoustic impedance of each of the acoustic matching members 13, 13p. For example, the vibration damper 18 can be made of silicone rubber. Also, the vibration damper 18 can be made of a material having a low elasticity coefficient and having a low density. For example, a foam material such as resin foam, foam rubber, or sponge rubber can be suitably used as a material for the vibration damper 18.

Since the vibration damper 18 is made of such a material and located among the acoustic matching members 13, 13p, the vibration damper 18 can prevent the ultrasonic wave from propagating among the acoustic matching members 13, 13p. Thus, noise originating from the ultrasonic wave propagation can be prevented. In the first embodiment, the vibration damper 18 has a thickness of one millimeter or less at a portion covering the receiving surfaces 13j and the transmitting surface 13s. In such an approach, the ultrasonic wave can be suitably transmitted and received through the vibration damper 18.

The first absorber 19 is made of a material having an elasticity coefficient less than an elasticity coefficient of each of the piezoelectric element 14p and the multilayer piezoelectric element 16. For example, the first absorber 19 can be made of a potting material. Alternatively, the first absorber 19 can be made of a high-polymer material such as urethane, rubber, or silicon. The first absorber 19 is located between the housing 31 and each of the multilayer piezoelectric element 16 of the transmitting device 11 and the piezoelectric elements 14p of the receiving devices 12p-12r. Thus, each piezoelectric element is entirely surrounded by the first absorber 19. Further, the acoustic matching member 13 of the transmitting device 11 and the acoustic matching members 13p of the receiving devices 12p-12r can be partially surrounded by the first absorber 19.

Even when impact force is applied to the transmitting device 11 and the receiving devices 12p-12r, for example, by a small stone hit against the vibration damper 18 during movement of the vehicle, the first absorber 19 can absorb the impact force. Further, the first absorber 19 helps prevent the transmitting device 11 and the receiving devices 12p-12r from being displaced toward a bottom 31a of the housing 31. In this way, the first absorber 19 protects the transmitting device 11 and the receiving devices 12p-12r from the impact force. Furthermore, since each piezoelectric element is surrounded by the first absorber 19, each piezoelectric element can be surely protected from environmental factors such as water and dust. Accordingly, reliability of the ultrasonic sensor 10 can be improved.

The vibration isolator 90 is shaped like a plate and made of a material having a higher elasticity coefficient and a higher acoustic impedance than the first absorber 19. The vibration isolator 90 is located between the transmitting device 11 and each of the receiving devices 12p, 12r, which are located adjacent to the transmitting device 11. The vibration isolator 90 stands on the bottom 31a of the housing 31 to partition an inner space of the housing 31. The transmitting device 11 is enclosed with the vibration isolator 90 and a side wall of the housing 31. Thus, the transmitting device 11 is isolated by the vibration isolator 90 from the receiving devices 12p-12r. The vibration isolator 90 is fixed to the vibration damper 18 at one end and fixed to the first absorber 19 at the other end. The thickness of the vibration isolator 90 is determined to suitably reduce propagation of the ultrasonic wave from the multilayer piezoelectric element 16 to the acoustic matching members 13p. Further, the thickness of the vibration isolator 90 is determined to suitably reduce interference of the vibration isolator 90 with the acoustic matching members 13p at the vibration damper 18.

When the ultrasonic sensor 10 is driven, the circuit device 20 receives the control signal from the ECU of the vehicle. Based on the control signal, the circuit device 20 applies to the piezoelectric element 16 a voltage of a frequency equal to a common resonance frequency Fc of the acoustic matching member 13 and the acoustic matching members 13p. The piezoelectric element 16 vibrates according to the applied voltage so that an ultrasonic wave of the resonance frequency Fc can be transmitted through the acoustic matching member 13 from the transmitting surface 13s to the outside of the vehicle.

In the first embodiment, the multilayer piezoelectric element 16 has a five-layered structure. Therefore, pressure of the ultrasonic wave emitted by the multilayer piezoelectric element 16 can be five times greater than that of an ultrasonic wave emitted by a single-layer piezoelectric element. Thus, the multilayer piezoelectric element 16 can emit the ultrasonic wave having high pressure.

The vibration isolator 90, which isolates the transmitting device 11 from the receiving devices 12p-12r, has a higher elasticity coefficient and a higher acoustic impedance than the first absorber 19. The ultrasonic wave emitted by the multilayer piezoelectric element 16 is reflected at an interface between the first absorber 19 and the vibration isolator 90. In this way, although pressure of the ultrasonic wave emitted by the multilayer piezoelectric element 16 is high, the vibration isolator 90 can suitably reduce propagation of the ultrasonic wave from the transmitting device 11 to the receiving devices 12p-12r. Accordingly, noise originating from the propagation can be reduced.

The ultrasonic wave emitted by the multilayer piezoelectric element 16 propagates through the acoustic matching member 13 and is then transmitted from the transmitting surface 13s to the outside of the vehicle. The transmitted ultrasonic wave is reflected from the object, received at the receiving surfaces 13j of the acoustic matching members 13p, and then propagates to the piezoelectric elements 14p through the acoustic matching members 13p.

Each piezoelectric element 14p produces an output voltage having amplitude corresponding to a sound pressure of the ultrasonic wave. The output voltage of the piezoelectric element 14p is transmitted to the circuit device 20. The circuit device 20 compares the amplitude of the output voltage with the threshold voltage Vs. When the amplitude of the output voltage is equal to or greater than the threshold voltage Vs, the circuit device 20 determines that the ultrasonic wave is received. Upon determination that the ultrasonic wave is received, the circuit device 20 outputs a vibration signal corresponding to the output voltage to the ECU.

For example, a distance between the ultrasonic sensor 10 and the object can be measured based on elapsed time from when the ultrasonic wave is transmitted to when the ultrasonic wave is received. In addition, since the receiving devices 12p-12r are arranged in an array pattern, a three dimensional position of the object with respect to the ultrasonic sensor 10 can be detected based on a time difference or a phase difference between the ultrasonic waves received by the receiving devices 12p-12r.

The vibration damper 18 is interposed among the acoustic matching members 13p of the receiving devices 12p-12r. The ultrasonic wave is divided by the acoustic matching members 13p. The divided ultrasonic waves propagate to the receiving devices 12p-12r through the respective acoustic matching members 13p. Therefore, good crosstalk characteristics are achieved so that the ultrasonic sensor 10 can accurately detect the ultrasonic wave.

Figure 3:
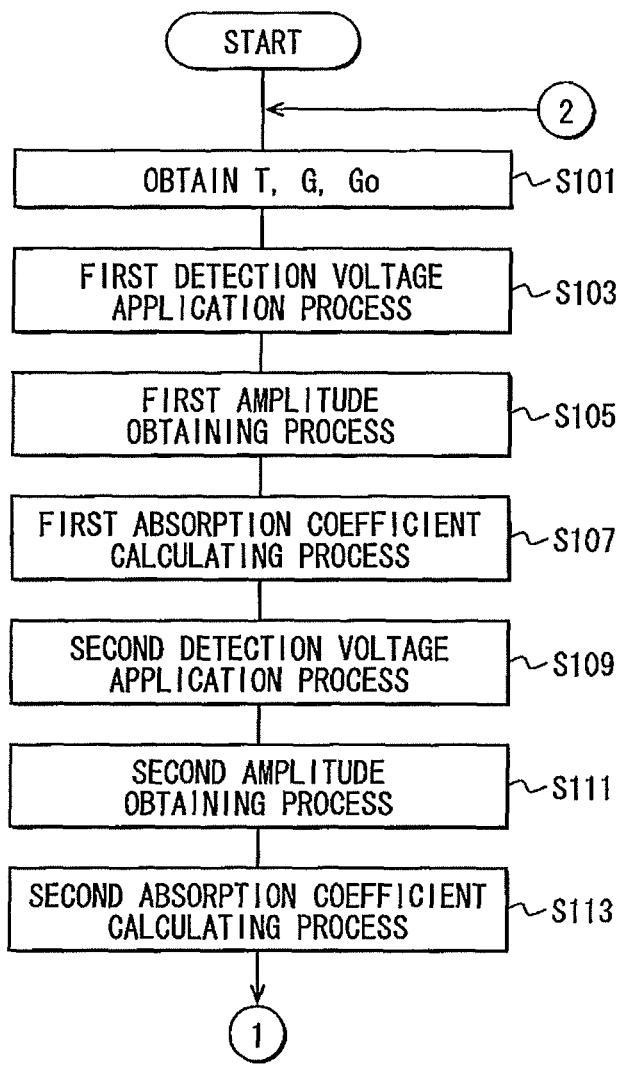
FIG. 3 is a flow chart illustrating a first part of a threshold adjustment process performed by a circuit device of the ultrasonic sensor of the first embodiment.
Figure 4:
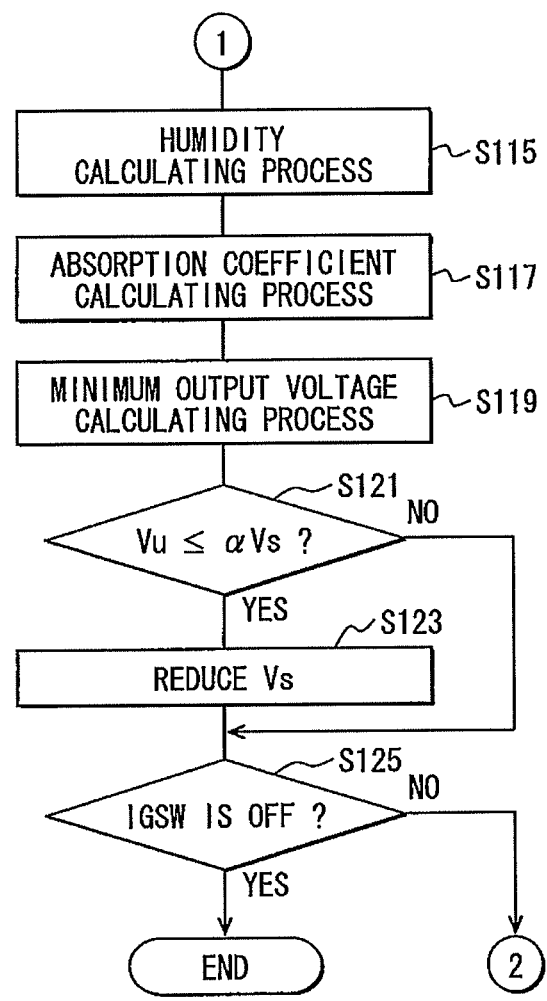
FIG. 4 is a flow chart illustrating a second part of the threshold adjustment process.

The circuit device 20 performs a threshold adjustment process illustrated in FIGS. 3 and 4.

The threshold adjustment process starts at S101, where the circuit device 20 obtains a temperature T, an atmospheric pressure G, and a saturated vapor pressure Go from sensors (not shown) such as a temperature sensor and an atmospheric pressure sensor. Then, the threshold adjustment process proceeds to S103, where the circuit device 20 performs a first detection voltage application process. In the first detection voltage application process, the circuit device 20 applies a first detection voltage of a first frequency F1 to the multilayer piezoelectric element 16 of the transmitting device 11 for a short period of time. The first frequency F1 is slightly smaller than the resonance frequency Fc of the acoustic matching members 13, 13p. The multilayer piezoelectric element 16 vibrates according to the applied first detection voltage so that an ultrasonic wave of the first frequency F1 can be transmitted through the acoustic matching member 13 from the transmitting surface 13s to the outside of the vehicle. For example, the first frequency F1 can be three kilohertz (3 kHz) smaller than the resonance frequency Fc.

The transmitted ultrasonic wave of the first frequency F1 is reflected from the object and then propagates to the piezoelectric elements 14p through the acoustic matching members 13p. Each piezoelectric element 14p produces an output voltage corresponding to the ultrasonic wave.

Next, the threshold adjustment process proceeds to S105, where the circuit device 20 performs a first amplitude obtaining process. In the first amplitude obtaining process, the circuit device 20 obtains an amplitude V of the output voltage of the piezoelectric element 14p as a first amplitude V1.

The amplitude V of the output voltage of the piezoelectric element 14p is given by the following equation:

$$V = S \times P \quad (1)$$

In the equation (1), P represents a sound pressure of the ultrasonic wave that has propagated to the piezoelectric element 14p, and S represents sensitivity of the piezoelectric element 14p.

The ultrasonic wave is attenuated while propagating in air over a round-trip distance R between the ultrasonic sensor 10 and the object. The sound pressure P is given by the following equation:

$$P = Ae^{-MR}/R \quad (2)$$

In the equation (2), A represents a predetermined coefficient, and M represents an absorption coefficient. For example, the coefficient A is determined based on a known initial sound pressure by assuming that the round-trip distance R is 0.2 meters.

After the first amplification V1 is obtained at S105, the threshold adjustment process proceeds to S107, where the circuit device 20 performs a first absorption coefficient calculating process. In the first absorption coefficient calculating process, the circuit device 20 calculates a first absorption coefficient M1 from the equations (1)(2) using the obtained first amplitude V1.

After the first absorption coefficient M1 is calculated at S107, the threshold adjustment process proceeds to S109, where the circuit device 20 performs a second detection voltage application process. In the second detection voltage application process, a second detection voltage having a second frequency F2 is applied to the multilayer piezoelectric element 16 of the transmitting device 11 for a short period of time. The second frequency F2 is slightly greater than the resonance frequency Fc. The multilayer piezoelectric element 16 vibrates according to the applied second detection voltage. Thus, an ultrasonic wave having the second frequency F2 is transmitted through the acoustic matching member 13 from the transmitting surface 13s to the outside of the vehicle. For example, the second frequency F2 can be three kilohertz (3 kH) greater than the resonance frequency Fc.

To improve transmitting and receiving sensitivities, there is a need to bring each of the first and second frequencies F1, F2 close to the resonance frequency Fc. In the first embodiment, the transmitting device 11 is constructed with the acoustic matching member 13 and the multilayer piezoelectric element 16 joined to the acoustic matching member 13. The acoustic matching member 13 is made of a resin material and has a Q-value of about ten. As compared to a membrane-type transmitting device formed with a silicon substrate, the transmitting device 11 can have a small Q-value and a low resonance frequency. Therefore, the transmitting device 11 can easily transmit ultrasonic waves of different frequencies F1, F2, each of which is close to the resonance frequency Fc.

The transmitted ultrasonic wave of the second frequency F2 is reflected from the object and then propagates to the piezoelectric elements 14p through the acoustic matching members 13p. Each piezoelectric element 14p produces an output voltage corresponding to the ultrasonic wave.

Next, the threshold adjustment process proceeds to S111, where the circuit device 20 performs a second amplitude obtaining process. In the second amplitude obtaining process, the circuit device 20 obtains the amplitude V of the output voltage of the piezoelectric element 14p as a second amplitude V2.

Then, the threshold adjustment process proceeds to S113, where the circuit device 20 performs a second absorption coefficient calculating process. In the second absorption coefficient calculating process, the circuit device 20 calculates a second absorption coefficient M2 from the equations (1)(2) using the obtained second amplitude V2.

Then, the threshold adjustment process proceeds to S115, where the circuit device 20 performs a humidity calculating process. In the humidity calculating process, a first equation containing a variable K is obtained by substituting the first frequency F1, the first absorption coefficient M1, and the temperature T into the following equation:

$$M=(33+0.2T)F^2 \times 10^{-12}+NF/\{K/(2\pi F)+(T\pi F)/K\} \quad (3)$$

In the equation (3), N represents a predetermined coefficient, and $\pi$ represents pi. Likewise, a second equation containing the variable K is obtained by substituting the second frequency F2, the second absorption coefficient M2, and the temperature T into the above equation (3). Then, the variable K is calculated from the obtained first and second equations. Then, a humidity H is calculated by substituting the variable K, the atmospheric pressure G, and the saturated vapor pressure Go into the following equation:

$$K=1.92 \times (Go/G \times H)^{1.3} \times 10^5 \quad (4)$$

The above-mentioned equations (2)-(4) are based on descriptions in E. J. Evans and E. N. Bazley, Acustica 6, 238-244(1956) and H. O. Knerser J. acoust. soc. Am. 5 122 (1933).

After the humidity H is calculated at S115, the threshold adjustment process proceeds to S117, where the circuit device 20 performs an absorption coefficient calculating process. In the absorption coefficient calculating process, the absorption coefficient M is calculated by using the humidity H from the equations (3), (4) per frequency of a voltage that is applied by the circuit device 20 to the multilayer piezoelectric element 16 based on the control signal from the ECU.

Then, the threshold adjustment process proceeds to S119, where the circuit device 20 performs a minimum output voltage calculating process. In the minimum output voltage calculating process, the sound pressure P of the ultrasonic wave that have propagated to the piezoelectric element 14p after propagating in air over the round-trip distance R is calculated from the equation (2) by using the absorption coefficient M that is calculated at S117. Then, a minimum output voltage Vu is calculated from the equation (1) by using the calculated sound pressure P.

After the minimum output voltage Vu is calculated at S119, the threshold adjustment process proceeds to S121, where the circuit device 20 determines whether the minimum output voltage Vu is equal to or less than a value derived by multiplying the threshold voltage Vs by a predestined coefficient α. That is, at S121, the circuit device 20 determines whether Vu≤αVs. The reason to compare the minimum output voltage Vu with the multiplied threshold voltage αVs is that there is a possibility of failing to accurately detect the ultrasonic wave due to a reduction in the minimum output voltage Vu if the minimum output voltage Vu is directly compared with the threshold voltage Vs. In the first embodiment, the coefficient α is 2.0 (i.e., α=2.0). The multiplied threshold αVs corresponds to a second threshold voltage.

If the minimum output voltage Vu is greater than the multiplied threshold αVs corresponding NO at S121, the threshold adjustment process jumps to S125.

In contrast, if the minimum output voltage Vu is equal to or less than the multiplied threshold αVs corresponding YES at S121, the threshold adjustment process proceeds to S123, where the circuit device 20 performs a threshold reduction process. In the threshold reduction process, the threshold voltage Vs is reduced to a value that is derived by dividing the minimum output voltage Vu by a predestined coefficient β. In the first embodiment, the coefficient β is set equal to the coefficient α. Alternatively, the coefficient β can be set different than the coefficient α.

In this way, if the minimum output voltage Vu becomes equal to or less than the multiplied threshold αVs due to a change in the humidity H, the threshold voltage Vs is reduced at S123. By the way, the reduced threshold voltage Vs can be reset to an initial value (i.e., the threshold voltage Vs before reduced) or can be gradually increased to the initial value, when a predetermined time period has elapsed after S123.

Then, the threshold adjustment process proceeds from S123 to S125. At S125, the circuit device 20 determines whether an ignition switch (IGSW) of the vehicle is in an OFF state. If the ignition switch is in the OFF state corresponding to YES at S125, the threshold adjustment process ends. In contrast, if the ignition switch is in an ON state corresponding to NO at S125, the threshold adjustment process returns to S101.

As described above, according to the ultrasonic sensor 10 of the first embodiment, the circuit device 20 applies the voltage to the multilayer piezoelectric element 16 to cause the multilayer piezoelectric element to emit the ultrasonic wave. The circuit device 20 detects that the piezoelectric element 14p receives the ultrasonic wave, when the output voltage of the piezoelectric element 14p is equal to or greater than the threshold voltage Vs. Further, based on the humidity H calculated in the humidity calculating process performed at S115, the circuit device 20 calculates the sound pressure P of the ultrasonic wave that has propagated in air over the round-trip distance R. If the minimum output voltage Vu calculated from the sound pressure P is equal to or less than the multiplied threshold voltage αVs, the circuit device 20 reduces the threshold voltage Vs.

In this way, the circuit device 20 estimates the amount of attenuation of the ultrasonic wave (i.e., the amount of reduction in the sound pressure P) due to a change in the humidity H. The circuit device 20 reduces the threshold voltage Vs according to the minimum output voltage Vu (i.e., according to the amount of attenuation of the ultrasonic wave). Thus, the threshold voltage Vs can be adjusted according to the change in the humidity H.

Specifically, in the threshold adjustment process illustrated in FIGS. 3 and 4, if the minimum output voltage Vu, which is calculated from the sound pressure P of the ultrasonic wave that has propagated to the piezoelectric element 14$p$ after propagating in the air over the round-trip distance R, is equal to or less than the multiplied threshold voltage $\alpha$Vs, the circuit device 20 adjusts the threshold voltage Vs so that the threshold voltage Vs can be reduced. That is, the minimum output voltage Vu is compared with the multiplied threshold voltage $\alpha$Vs, not the threshold voltage Vs.

In such an approach, even when the minimum output voltage Vu decreases, the ultrasonic sensor 10 can accurately detect the ultrasonic wave.

Further, according to the ultrasonic sensor 10 of the first embodiment, the variation K is calculated from the equation (4) using the humidity H, which is calculated in the humidity calculating process. The absorption coefficient M is calculated from the equation (3) using the variation K. The sound pressure P of the ultrasonic wave is calculated from the equation (2) using the absorption coefficient M. The minimum output voltage Vu is calculated using the sound pressure P. If the minimum output voltage Vu is equal to or less than the multiplied threshold voltage $\alpha$Vs, the threshold voltage Vs is adjusted so that the threshold voltage Vs can be reduced.

In this way, the sound pressure P of the ultrasonic wave that has propagated to the piezoelectric element 14$p$ after propagating in air over the round-trip distance R is calculated from the equations (2)-(4) using the humidity H, the frequency F of the ultrasonic wave, the temperature T, the atmospheric pressure G, and the saturated vapor pressure Go. In such an approach, the amount of attenuation of the ultrasonic wave (the amount of reduction in the sound pressure P) due to the change in the humidity H can be estimated.

According to the ultrasonic sensor 10 of the first embodiment, the circuit device 20 applies the first detection voltage of the first frequency F1 to the multilayer piezoelectric element 16 for a short period of time to cause the multilayer piezoelectric element 16 to emit the ultrasonic wave of the first frequency F1. The circuit device 20 calculates the first absorption coefficient M1 from the equation (2) using the sound pressure P that is calculated from the equation (1) using the first amplitude V1 of the output voltage of the piezoelectric element 14$p$ that has received the ultrasonic wave transmitted by application of the first detection voltage. Likewise, the circuit device 20 applies the second detection voltage of the second frequency F2 to the multilayer piezoelectric element 16 for a short period of time to cause the multilayer piezoelectric element 16 to emit the ultrasonic wave of the second frequency F2. The circuit device 20 calculates the second absorption coefficient M2 from the equation (2) using the sound pressure P that is calculated from the equation (1) using the second amplitude V2 of the output voltage of the piezoelectric element 14$p$ that have received the ultrasonic wave transmitted by application of the second detection voltage. Then, the circuit device 20 derives the first equation containing the variable K by substituting the first frequency F1, the first absorption coefficient M1, and the temperature T into the equation (3). Further, the circuit device 20 derives the second equation containing the variable k by substituting the second frequency F2, the second absorption coefficient M2, and the temperature T into the equation (3). Then, the circuit device 20 calculates the variable K from the first and second equations. Then, the circuit device 20 calculates the humidity H by substituting the variable K, the atmospheric pressure G, and the saturated vapor pressure Go into the equation (4).

In such a approach, the circuit device 20 obtains the humidity H without using a special device such as a humidity sensor. Further, since each of the first and second frequencies F1, F2 is set close to the resonance frequency Fc, the transmitting device 11 can transmit the ultrasonic waves of the first and second frequencies F1, F2 with high sensitivity. Therefore, an increase in cost for detecting the humidity H can be reduced.

Further, according to the ultrasonic sensor 10, the acoustic matching member 13 of the transmitting device 11 is made of a resin material. As compared to, for example, a membrane-type transmitting device formed with a silicon substrate, the transmitting device 11 can have a small Q-value and a low resonance frequency. Therefore, the transmitting device 11 can easily transmit the ultrasonic waves of different frequencies F1, F2, each of which is close to the resonance frequency Fc.

Further, according to the ultrasonic sensor 10, the transmitting device 11 includes the multilayer piezoelectric element 16. Therefore, the transmitting device 11 can transmit an ultrasonic wave of high pressure.

Further, according to the ultrasonic sensor 10, the piezoelectric elements 14$p$ of the receiving devices 12$p$-12$r$ can be made of piezoelectric zirconate titanate (PZT). In such an approach, the piezoelectric elements 14$p$ can detect an ultrasonic wave of low pressure. Thus, the piezoelectric elements 14$p$ can detect the ultrasonic wave with high sensitivity.

Further, according to the ultrasonic sensor 10, the receiving devices 12$p$-12$r$ are arranged in a array pattern. Therefore, the distance and the azimuth angle of the object relative to the ultrasonic sensor 10 can be measured based on the ultrasonic waves detected by the receiving devices 12$p$-12$r$. Thus, the three dimensional position of the object with respect to the ultrasonic sensor 10 can be measured.

Second Embodiment

An ultrasonic sensor 110 according to a second embodiment of the present invention is described below with reference to FIGS. 5 and 6. A difference between the first and second embodiments is as follows.

The ultrasonic sensor 110 further includes a pair of electrodes 41 used to detect a dielectric constant of the first absorber 19. A circuit device 20 of the ultrasonic sensor 110 performs a threshold adjustment process illustrated in FIG. 6 instead of the threshold adjustment process illustrated in FIGS. 3 and 4.

Figure 5:
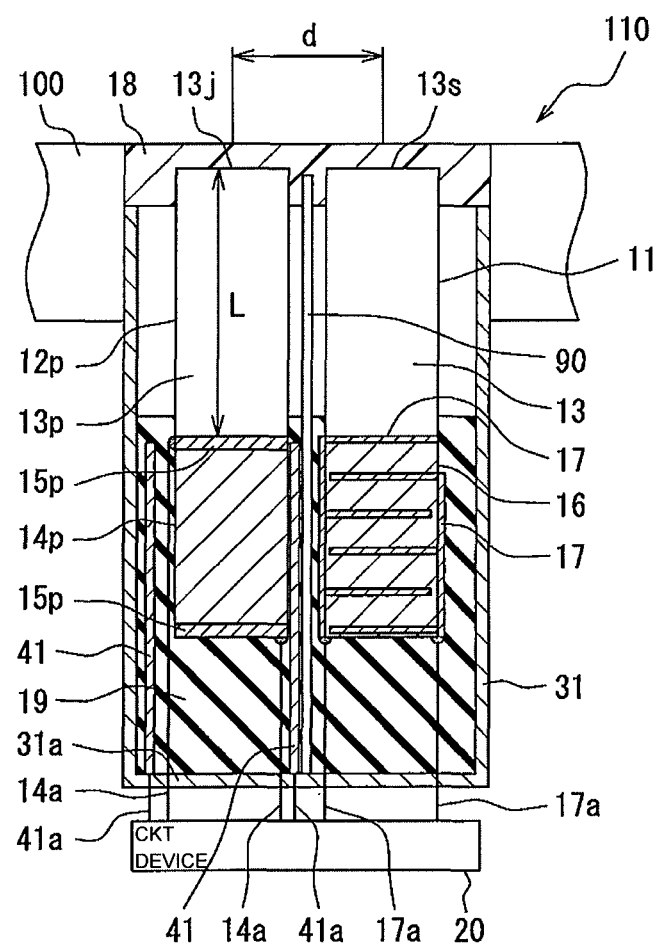
FIG. 5 is a diagram illustrating a cross-sectional view of an ultrasonic sensor according to a second embodiment of the present invention.
Figure 6:
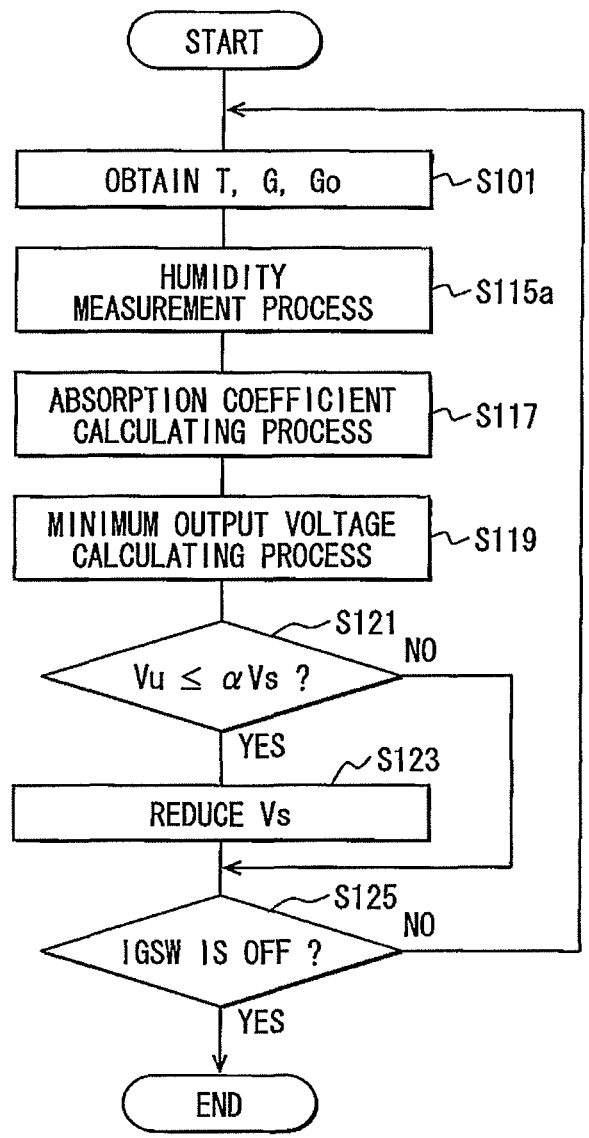
FIG. 6 is a flow chart illustrating a threshold adjustment process performed by a circuit device of the ultrasonic sensor of the second embodiment.

As shown in FIG. 5, the electrodes 41 are embedded in the first absorber 19 and spaced from each other. The electrodes 41 are electrically connected to the circuit device 20 through wires 41$a$, respectively. The circuit device 20 detects the dielectric constant of the first absorber 19 based on a capacitance between the electrodes 41.

The threshold adjustment process performed by the circuit device 20 of the ultrasonic sensor 110 is described below with reference to FIG. 6.

The threshold adjustment process starts at S101, where the circuit device 20 obtains the temperature T, the atmospheric pressure G, and the saturated vapor pressure Go. Then, the threshold adjustment process proceeds to S115$a$, where the circuit device 20 performs a humidity measurement process. In the humidity measurement process, the circuit device 20 detects the dielectric constant of the first absorber 19 based on the capacitance between the electrodes 41 that are embedded in the first absorber 19. For example, while the dielectric constant of the first absorber 19 is in the range of about three to about six, the dielectric constant of water is about eighty. Since the dielectric constant of the first absorber 19 increases with an increase in the humidity H, the humidity H can be measured based on the dielectric constant of the first absorber 19.

After the humidity H is measured at S115a, the threshold adjustment process proceeds to S117, S119, S121, S123, and S125 in the same manner as in the first embodiment. Thus, the threshold voltage Vs is suitably adjusted according to the humidity H.

As described above, according to the ultrasonic sensor 110 of the second embodiment, the electrodes 41 are embedded in the first absorber 19, the dielectric constant of the first absorber 19 is detected based on the capacitance between the electrodes 41, and the humidity H is measured based on the dielectric constant of the first absorber 19. In such an approach, the humidity H is measured without using a special device such as a humidity sensor so that manufacturing cost of the ultrasonic sensor 110 can be reduced.

Third Embodiment

Figure 7:
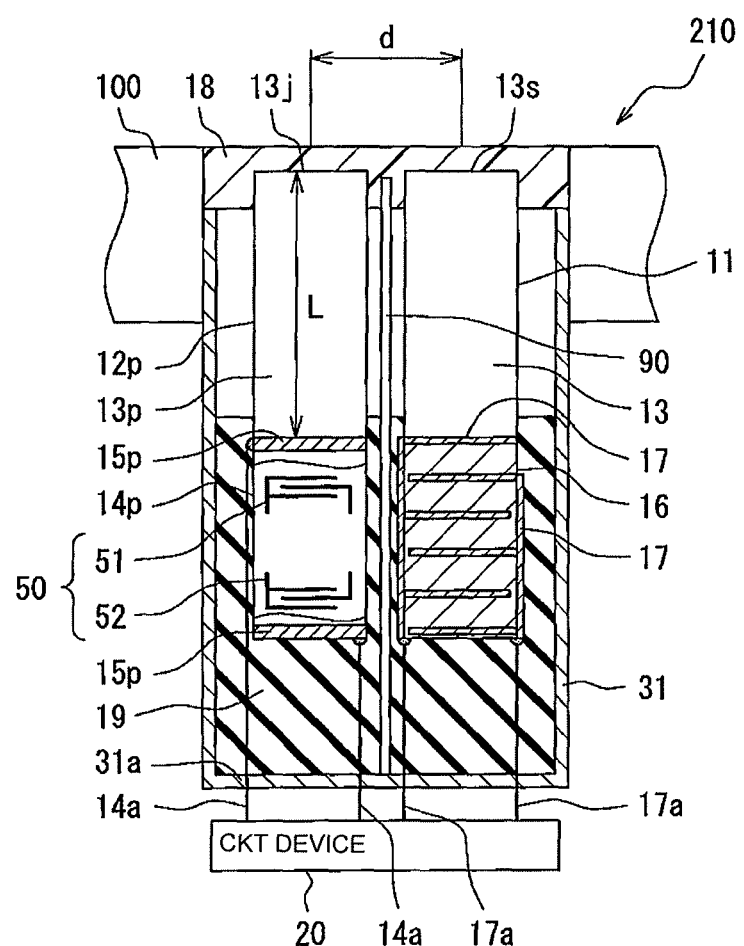
FIG. 7 is a diagram illustrating a cross-sectional view of an ultrasonic sensor according to a third embodiment of the present invention.

An ultrasonic sensor 210 according to a third embodiment of the present invention is described below with reference to FIG. 7. A difference between the second and the third embodiments is as follows.

The ultrasonic sensor 210 includes a surface acoustic wave (SAW) element 50 instead of the electrodes 41 of the ultrasonic sensor 110.

The SAW element 50 includes electrodes 51, 52. As can be seen from FIG. 7, each of the electrodes 51, 52 has a comb shape and attached on a surface of the piezoelectric element 14p. It is noted that the piezoelectric element 14p of FIG. 7 is not a cross-sectional view for explanation purpose. The electrodes 51, 52 are spaced from each other and electrically connected to the circuit device 20 through wires (not shown), respectively.

The SAW element 50 receives a control signal from the circuit device 20 and causes the electrode 51 to emit a surface acoustic wave of a predetermined frequency according to the control signal. The emitted surface acoustic wave propagates along a surface of the piezoelectric element 14p and is received by the electrode 52. The electrode 52 produces an electrical signal corresponding to the received surface acoustic wave. It is noted that the SAW element 50 is provided with a film varying with the humidity H. Therefore, as the humidity H increases, it is likely that the surface acoustic wave is absorbed by the film. As a result, the amplitude of the surface acoustic wave received by the electrode 52 becomes smaller than the amplitude of the surface acoustic wave emitted by the electrode 51.

The threshold adjustment process performed by the circuit device 20 of the ultrasonic sensor 210 is described below with reference to FIG. 6.

The threshold adjustment process starts at S101, where the circuit device 20 obtains the temperature T, the atmospheric pressure G, and the saturated vapor pressure Go. Then, the threshold adjustment process proceeds to S115a, where the circuit device 20 performs a humidity measurement process. In the humidity measurement process, the circuit device 20 measures the humidity H based on a difference in frequency between the surface acoustic wave emitted by the electrode 51 and the surface acoustic wave received by the electrode 52.

As noted above, the SAW element 50 is provided with the film varying with the humidity H. Therefore, as the humidity H increases, the amplitude of the surface acoustic wave decreases during propagation from the electrode 51 to the electrode 52. In other words, the frequency of the surface acoustic wave changes with the humidity H during propagation from the electrode 51 to the electrode 52. Thus, the humidity H can be measured based on the difference in frequency between the surface acoustic wave emitted by the electrode 51 and the surface acoustic wave received by the electrode 52.

After the humidity H is measured at S115a, the threshold adjustment process proceeds to S117, S119, S121, S123, and S125 in the same manner as in the second embodiment. Thus, the threshold voltage Vs is suitably adjusted according to the humidity H.

As described above, according to the ultrasonic sensor 210 of the third embodiment, the SAW element 50 having the electrodes 51, 52 is attached on the surface of the piezoelectric element 14p. The humidity H is measured based on the difference in frequency between the surface acoustic wave emitted by the electrode 51 and the surface acoustic wave received by the electrode 52. In such an approach, the humidity H is measured without using a special device such as a humidity sensor.

Alternatively, the SAW element can be attached to a surface of a device other than the piezoelectric element 14p to measure the humidity H.

Fourth Embodiment

Figure 8:
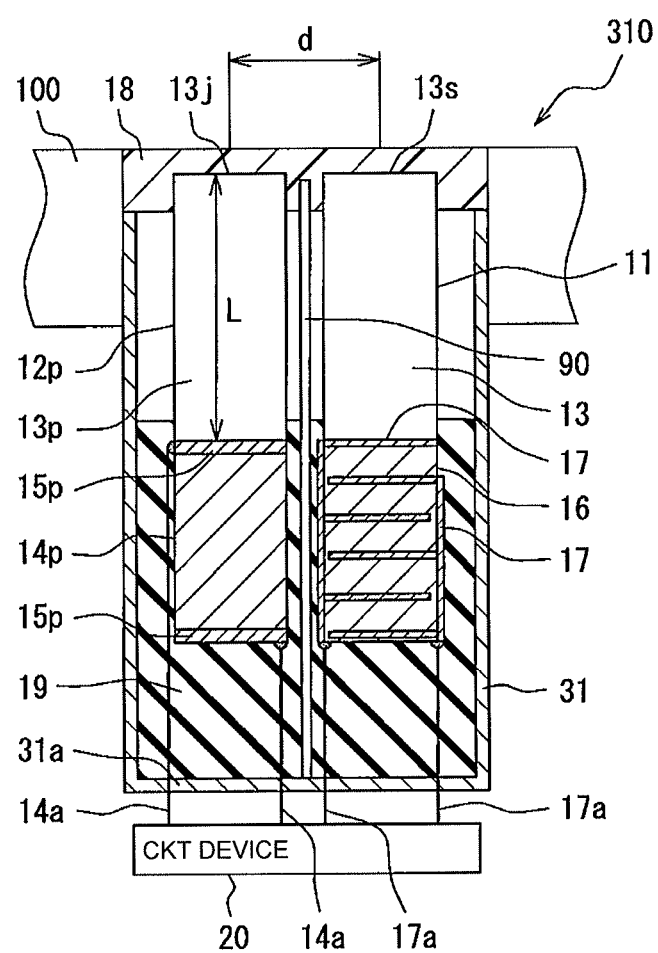
FIG. 8 is a diagram illustrating a cross-sectional view of an ultrasonic sensor according to a fourth embodiment of the present invention.

An ultrasonic sensor 310 according to a fourth embodiment of the present invention is described below with reference to FIG. 8-10. As can be seen by comparing FIG. 1B and 8, the ultrasonic sensor 310 has the same structure as the ultrasonic sensor 10 of the first embodiment. A difference between the first and fourth embodiments is that a circuit device 20 of the ultrasonic sensor 310 performs a frequency adjustment process illustrated in FIG. 9 instead of the threshold adjustment process illustrated in FIGS. 3 and 4.

The frequency adjustment process starts at S1101, where the circuit device 20 determines whether a speed D of the vehicle equipped with the ultrasonic sensor 310 is equal to or less than an ultrasonic detectable speed Do. For example, the circuit device 20 can detect the vehicle speed D based on a speed signal supplied from the ECU. If the vehicle speed D is greater than the ultrasonic detectable speed Do corresponding to NO at S1101, S1101 is repeated until the vehicle speed D becomes equal to or less than the ultrasonic detectable speed Do. For example, in the fourth embodiment, the ultrasonic detectable speed Do is ten kilometers per hour (km/h). Alternatively, at S1101, the circuit device 20 can determine whether an engine of the vehicle starts. In this case, if the vehicle engine starts, the frequency adjustment process proceeds from S1101 to S1103.

If the vehicle speed D is equal to or less than the ultrasonic detectable speed Do corresponding to YES at S1101, the frequency adjustment process proceeds to S1103, where the circuit device 20 performs a detection voltage application process. In the detection voltage application process, the circuit device 20 applies a voltage of a detection frequency Fo to the multilayer piezoelectric element 16 for a short period of time. The multilayer piezoelectric element 16 vibrates according to the voltage so that an ultrasonic wave of the detection frequency Fo can be transmitted through the acoustic matching member 13 from the transmitting surface 13a to the outside of the vehicle.

The transmitted ultrasonic wave of the detection frequency Fo is reflected from the object, propagates through the acoustic matching members 13p, and then is received by the piezoelectric elements 14p.

Next, the frequency adjustment process proceeds to S1105, where the circuit device 20 performs a resonance frequency analysis process. In the resonance frequency analysis process, the circuit device 20 detects the resonance frequency Fc of the acoustic matching members 13, 13p based on a frequency of the ultrasonic wave received by the piezoelectric elements 14p. In this way, the circuit device 20 detects the resonance frequency Fc. Since the acoustic matching members 13, 13p are made of the same material, the acoustic matching members 13, 13p can have the same resonance frequency irrespective of an ambient temperature. That is, the acoustic matching members 13, 13p can have a common resonance frequency Fc irrespective of the ambient temperature.

Figure 10:
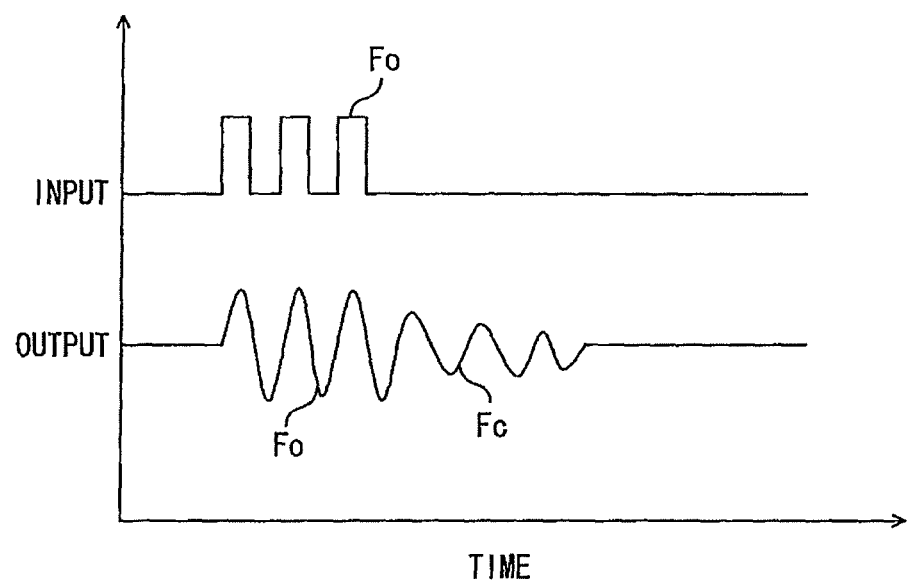
FIG. 10 is a diagram illustrating a relationship between a frequency of an input signal applied to a multilayer piezoelectric element of a transmitting device and a reverberation frequency of an output signal of a piezoelectric element of a receiving device of the ultrasonic sensor of the fourth embodiment.

Specifically, when the circuit device 20 applies an input voltage Vi of the detection frequency Fo to the multilayer piezoelectric element 16, the multilayer piezoelectric element 16 emits an ultrasonic wave of the detection frequency Fo as shown in FIG. 10. The ultrasonic wave of the detection frequency Fo is reflected from the object and propagates to each piezoelectric element 14p through the acoustic matching member 13p. The piezoelectric element 14p produces an output voltage Vo of the detection frequency Fo during receiving the ultrasonic wave of the detection frequency Fo. When propagation of the ultrasonic wave to the piezoelectric element 14p is completed, a frequency of the output voltage of the piezoelectric element 14p changes from the detection frequency Fo to a reverberation frequency. It is noted that the reverberation frequency is equal to the resonance frequency Fc. Therefore, the resonance frequency Fc can be detected by performing a frequency analysis of the reverberation frequency. The resonance frequency Fc can be detected based on the output voltage of any one of the piezoelectric elements 14p of the receiving devices 12p-12r. Alternatively, the resonance frequency Fc can be detected based on the output voltages of multiple piezoelectric elements 14p.

After the resonance frequency Fc is detected at S1105, the frequency adjustment process proceeds to S1107, where the circuit device 20 performs a time counting process. In the time counting process, the circuit device 20 counts an elapsed time ET from when the resonance frequency Fc is detected at S1105.

Then, the frequency adjustment process proceeds to S1109, where the circuit device 20 performs a frequency setting process. In the frequency setting process, the circuit device 20 sets a frequency of the voltage applied to the multilayer piezoelectric element 16 equal to the detected resonance frequency Fc.

In this setting condition, the voltage applied to the multilayer piezoelectric element 16 has the resonance frequency Fc. The multilayer piezoelectric element 16 vibrates according to the applied voltage so that an ultrasonic wave of the resonance frequency Fc can be transmitted through the acoustic matching member 13 from the transmitting surface 13a to the outside of the vehicle.

In this setting condition, since the ultrasonic wave emitted by the multilayer piezoelectric element 16 has the resonance frequency Fc, the emitted ultrasonic wave can be amplified during propagation through the acoustic matching member 13. Therefore, the ultrasonic sensor 310 can have a high transmitting sensitivity.

In this setting condition, since the ultrasonic wave reflected from the object has the resonance frequency Fc, the reflected ultrasonic wave can be amplified during propagation through the acoustic matching member 13p to the piezoelectric element 14p. Therefore, the ultrasonic sensor 310 can have a high receiving sensitivity.

Then, the frequency adjustment process proceeds to S1111, where the circuit device 20 determines whether the elapsed time ET is equal to or greater than a threshold time ETo.

If the elapsed time ET is less than the threshold time ETo corresponding to NO at S1111, the frequency adjustment process returns to S1109. In this way, the frequency setting process performed at S1109 is repeated until the elapsed time ET becomes equal to or greater than the threshold time ETo.

If the elapsed time ET becomes equal to or greater than the threshold time ETo corresponding to YES at S1111, the frequency adjustment process proceeds to S1113. At S1113, the circuit device 20 determines whether the ignition switch (IGSW) of the vehicle is in the OFF state. If the ignition switch is in the OFF state corresponding to YES at S1113, the threshold adjustment process ends. In contrast, if the ignition switch is in the ON state corresponding to NO at S1113, the threshold adjustment process returns to S1101. Thus, the resonance frequency Fc is detected each time the threshold time ETo elapses. In such an approach, the frequency of the voltage applied to the multilayer piezoelectric element 16 can be kept equal to the resonance frequency Fc despite the fact that the resonance frequency Fc varies with the temperature. Therefore, the ultrasonic sensor 310 can maintain the high transmitting and receiving sensitivities, even when the temperature varies.

As described above, according to the ultrasonic sensor 310 of the fourth embodiment, the circuit device 20 detects the common resonance frequency Fc of the acoustic matching members 13, 13p. The circuit device 20 sets the frequency of the voltage applied to the multilayer piezoelectric element 16 equal to the detected resonance frequency Fc.

In such an approach, the frequency of the ultrasonic wave emitted by the multilayer piezoelectric element 16 is adjusted to be equal to the resonance frequency Fc. Thus, the ultrasonic sensor 310 can maintain the high transmitting and receiving sensitivities, even when the temperature varies.

In the fourth embodiment, since the acoustic matching members 13, 13p are made of the same material, the acoustic matching members 13, 13p have the same temperature dependence of Young's modulus. Therefore, the acoustic matching members 13, 13p can have the same (i.e., common) resonance frequency Fc irrespective of the temperature.

Alternatively, the acoustic matching members 13, 13p can be made of different materials having the same temperature dependence of Young's modulus. Alternatively, the acoustic matching members 13, 13p can be made of different materials having different temperature dependences of Young's modulus. In this case, the circuit device 20 can set the frequency of the voltage applied to the multilayer piezoelectric element 16 equal to a resonance frequency of any one of the acoustic matching members 13, 13p.

Further, according to the ultrasonic sensor 310, the circuit device 20 detects the resonance frequency Fc by applying the voltage of the detection frequency Fo to the multilayer piezoelectric element 16 and then by performing the frequency analysis of the reverberation frequency of the output voltage of the piezoelectric element 14p. In such an approach, the resonance frequency Fc is surely detected so that the ultrasonic sensor 310 can maintain the high transmitting and receiving sensitivities.

Fifth Embodiment

Figure 12:
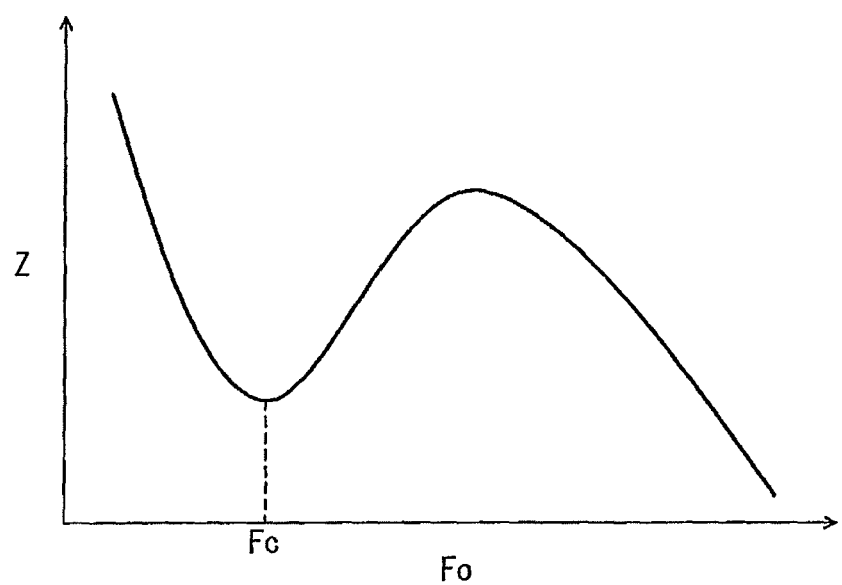
FIG. 12 is a diagram illustrating a relationship between a frequency of an ultrasonic wave propagating to a piezoelectric element of a receiving device of the ultrasonic sensor of the fifth embodiment and an impedance of the piezoelectric element.

An ultrasonic sensor according to the fifth embodiment of the present invention is described below with reference to FIGS. 11 and 12.

Figure 9:
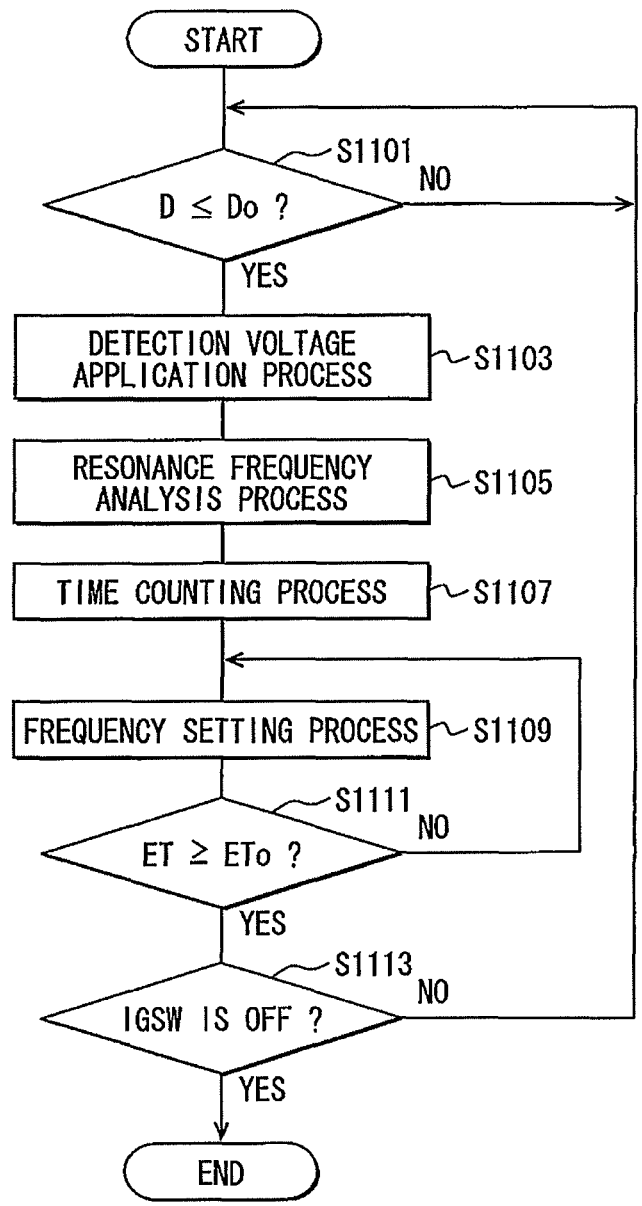
FIG. 9 is a flow chart illustrating a frequency adjustment process performed by a circuit device of the ultrasonic sensor of the fourth embodiment.
Figure 11:
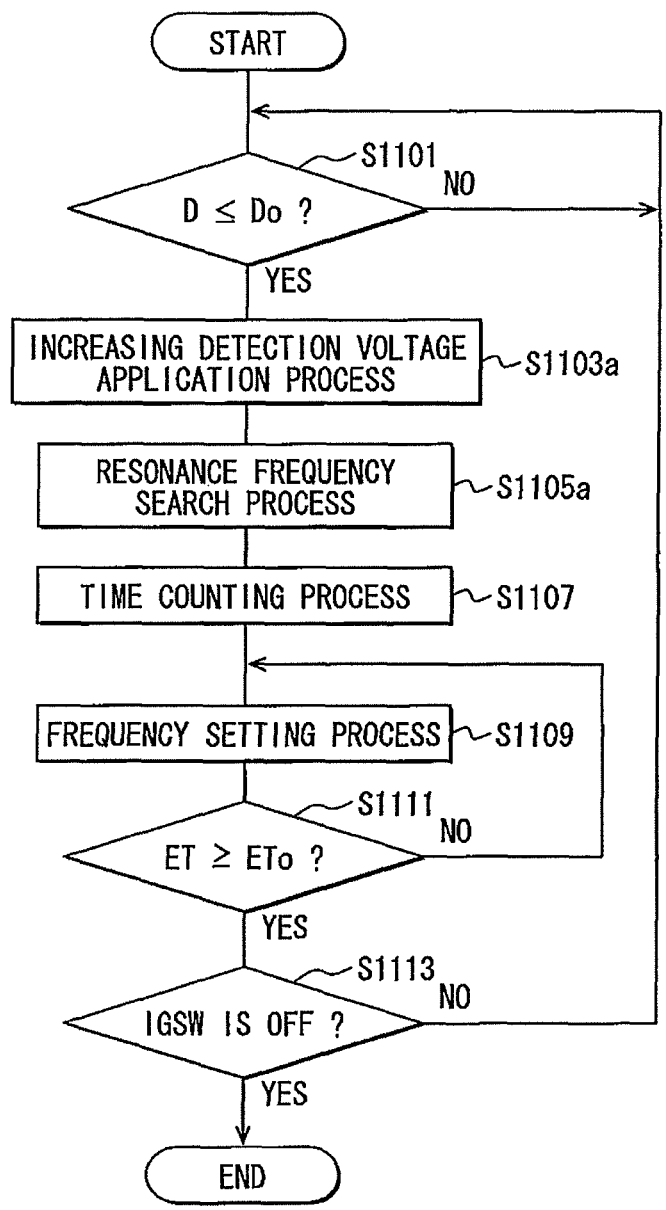
FIG. 11 is a flow chart illustrating a frequency adjustment process performed by a circuit device of the ultrasonic sensor of a fifth embodiment of the present invention.

A difference between the fourth and fifth embodiments is that the circuit device 20 of the ultrasonic sensor of the fifth embodiment performs a frequency adjustment process illustrated in FIG. 11 instead of the frequency adjustment process illustrated in FIG. 9.

The frequency adjustment process starts at S1101, where the circuit device 20 determines whether the vehicle speed D is equal to or less than the ultrasonic detectable speed Do. If the vehicle speed D is equal to or less than the ultrasonic detectable speed Do corresponding to YES at S1101, the frequency adjustment process proceeds to S1103a, where the circuit device 20 performs an increasing detection voltage application process. In the increasing detection voltage application process, the circuit device 20 applies to the multilayer piezoelectric element 16 a voltage having a detection frequency Fo that gradually increases with time. The multilayer piezoelectric element 16 vibrates according to the applied voltage so that an ultrasonic wave of the detection frequency Fo can be transmitted through the acoustic matching member 13 from the transmitting surface 13a to the outside of the vehicle. Alternatively, the circuit device 20 can apply to the multilayer piezoelectric element 16 a voltage of a detection frequency Fo that gradually decreases with time.

The ultrasonic wave of the detection frequency Fo is reflected from the object, propagates through the acoustic matching members 13p, and then is received by the piezoelectric elements 14p.

Next, the frequency adjustment process proceeds to S1105a, where the circuit device 20 performs a resonance frequency search process. In the resonance frequency search process, the circuit device 20 searches the resonance frequency Fc of the acoustic matching members 13, 13p based on a frequency of the ultrasonic wave received by the piezoelectric elements 14p and an impedance Z of the piezoelectric elements 14p.

Specifically, the piezoelectric element 14p produces an output current during receiving the ultrasonic wave of the detection frequency Fo. The output current of the piezoelectric element 14p changes with the detection frequency Fo that increases with time. Accordingly, as shown in FIG. 12, the impedance Z of the piezoelectric elements 14p changes with the detection frequency Fo. It is noted that the output current of the piezoelectric element 14p has a local maximum value when the piezoelectric element 14p receives the ultrasonic wave of the resonance frequency Fc. That is, the impedance Z of the piezoelectric element 14p has a local minimum value when the piezoelectric element 14p receives the ultrasonic wave of the resonance frequency Fc. Therefore, the resonance frequency Fc can be detected by searching the frequency of the output current corresponding to the local minimum value of the impedance Z. In this way, the circuit device 20 can detect the resonance frequency Fc. The resonance frequency Fc can be detected based on the local minimum value of the impedance Z of any one of the piezoelectric elements 14p. Alternatively, the resonance frequency Fc can be detected based on the local minimum value of each impedance Z of multiple piezoelectric elements 14p.

After the resonance frequency Fc is detected at S1105a, the frequency adjustment process proceeds to S1107, S1109, S1111, and S1113 in the same manner as in the fourth embodiment. In such an approach, the frequency of the voltage applied to the multilayer piezoelectric element 16 can be kept equal to the resonance frequency Fc despite the fact that the resonance frequency Fc varies with the temperature. Therefore, the ultrasonic sensor of the fifth embodiment can maintain the high transmitting and receiving sensitivities irrespective of the temperature.

As described above, according to the fifth embodiment of the present invention, the circuit device 20 applies the voltage of the detection frequency Fo that increases with time to the multilayer piezoelectric element 16 to cause the multilayer piezoelectric element 16 to emit the ultrasonic wave of the detection frequency Fo. The circuit device 20 measures the impedance Z of the piezoelectric element 14p that has received the ultrasonic wave of the detection frequency Fo. The impedance Z of the piezoelectric element 14p changes with the frequency of the received ultrasonic wave. The circuit device 20 detects the resonance frequency Fc by searching the frequency corresponding to the local minimum value of the impedance Z. The frequency of the ultrasonic wave emitted by the multilayer piezoelectric element 16 is adjusted to be equal to the detected resonance frequency Fc. Thus, the ultrasonic sensor of the fifth embodiment can maintain the high transmitting and receiving sensitivities irrespective of the temperature.

Alternatively, the circuit device 20 can detect the resonance frequency Fc by measuring an impedance of the multilayer piezoelectric element 16 and by searching a corresponding frequency to the local minimum value of the impedance. Alternatively, the circuit device 20 can detect the resonance frequency Fc by applying a voltage of an increasing frequency to the piezoelectric element 14p, by measuring an impedance of the piezoelectric element 14p, and then by searching a corresponding frequency to the local minimum value of the impedance.

Sixth Embodiment

An ultrasonic sensor 410 according to a sixth embodiment of the present invention is described below with reference to FIGS. 13 and 14. A difference between the fourth and sixth embodiments is as follows.

The ultrasonic sensor 410 further includes a pair of electrodes 41 used to detect a dielectric constant of the first absorber 19. A circuit device 20 of the ultrasonic sensor 410 performs a frequency adjustment process illustrated in FIG. 14 instead of the frequency adjustment process illustrated in FIG. 9.

Figure 13:
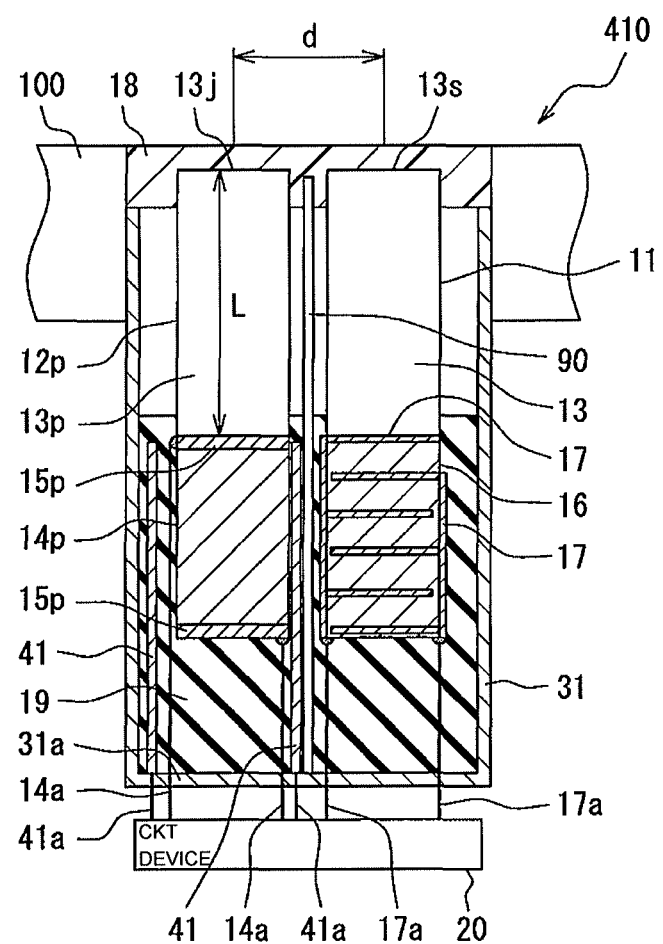
FIG. 13 is a diagram illustrating a cross-sectional view of an ultrasonic sensor according to a sixth embodiment of the present invention.
Figure 14:
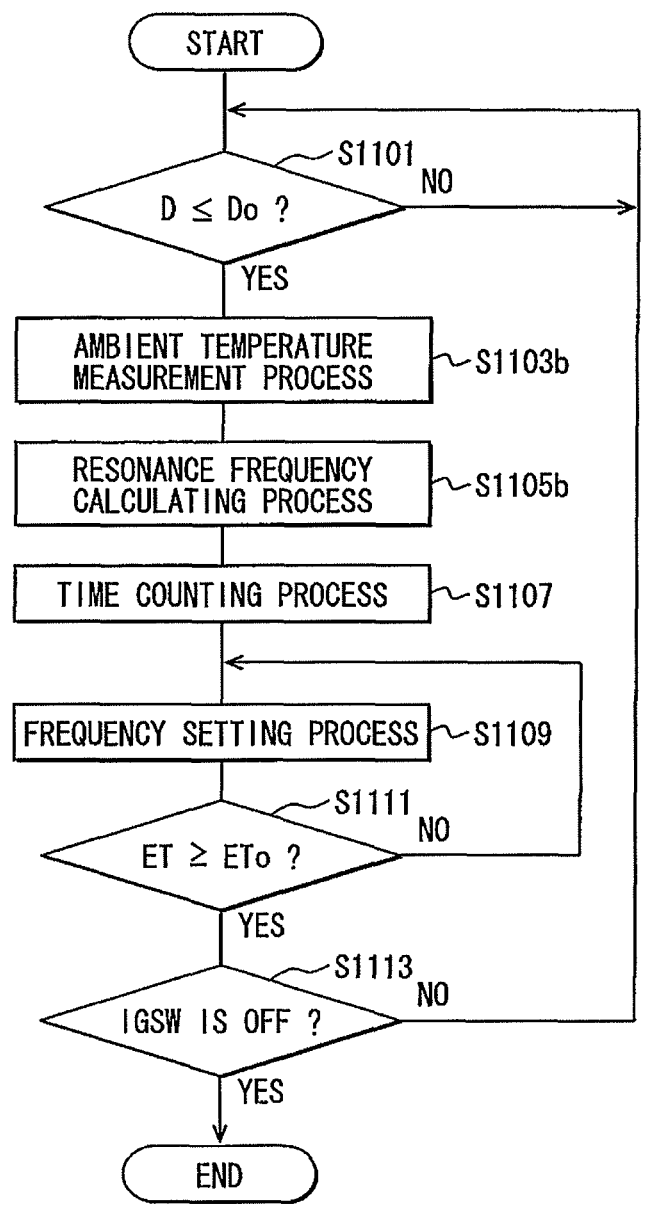
FIG. 14 is a flow chart illustrating a frequency adjustment process performed by a circuit device of the ultrasonic sensor of the sixth embodiment.

As shown in FIG. 13, the electrodes 41 are embedded in the first absorber 19 and spaced from each other. The electrodes 41 are electrically connected to the circuit device 20 through wires 41 a, respectively. The circuit device 20 detects the dielectric constant of the first absorber 19 based on a capacitance between the electrodes 41.

The frequency adjustment process performed by the circuit device 20 of the ultrasonic sensor 410 is described below with reference to FIG. 14.

The frequency adjustment process starts at S1101, where the circuit device 20 determines whether the vehicle speed D is equal to or less than the ultrasonic detectable speed Do. If the vehicle speed D is equal to or less than the ultrasonic detectable speed Do corresponding to YES at S1101, the frequency adjustment process proceeds to S1103b, where the circuit device 20 performs an ambient temperature measurement process. In the ambient temperature measurement process, the circuit device 20 detects the dielectric constant of the first absorber 19 based on the capacitance between the electrodes 41 that are embedded in the first absorber 19. Since the dielectric constant of the first absorber 19 increases with an increase in the ambient temperature, the ambient temperature can be measured based on the dielectric constant of the first absorber 19. Here, it is assumed that a temperature of each of the acoustic matching members 13, 13 is equal to the ambient temperature.

After the ambient temperature is measured at S1103b, the frequency adjustment process proceeds to 51105b, where the circuit device 20 performs a resonance frequency calculating process. In the resonance frequency calculating process, the circuit device 20 calculates a resonance frequency of the acoustic matching member 13p. That is, the circuit device 20 calculates the resonance frequency Fc of the acoustic matching members 13, 13p. The resonance frequency Fc is given by the following equation (5):

$$Fc = \{E/\{3p(1-v)\}\}^{1/2}/4L \quad (5)$$

In the equation (5), p represents the density of the acoustic matching member 13p, v represents a Poisson's ratio of the acoustic matching member 13p, L represents the thickness of the acoustic matching member 13p, and E represents a Young's modulus of the acoustic matching member 13p. It is noted that the Young's modulus of the acoustic matching member 13p is uniquely determined by the temperature of the acoustic matching member 13p, i.e., the ambient temperature detected at S1103b.

The equation (5) is derived as follows. As mentioned previously, the thickness L of the acoustic matching member 13p is substantially equal to one-quarter of the wavelength λ of the ultrasonic wave in the acoustic matching member 13p. That is, L=λ/4. The wavelength λ can be represented as follows using a speed C of sound in the acoustic matching member 13p: λ=C/Fc. Therefore, the resonance frequency Fc is given by the following equation (6):

$$Fc = C/4L \quad (6)$$

The sound speed C can be represented as follows using the density p, the Poisson's ratio v, and the Young's modulus E:

$$C = \{E/\{3p(1-v)\}\}^{1/2} \quad (7)$$

Thus, the equation (5) can be derived from the equations (6), (7).

After the resonance frequency Fc is calculated at S1105b, the frequency adjustment process proceeds to S1107, S1109, S1111, and S1113 in the same manner as in the fourth embodiment. In such an approach, the frequency of the voltage applied to the multilayer piezoelectric element 16 can be kept equal to the resonance frequency Fc despite the fact that the resonance frequency Fc varies with the temperature. Therefore, the ultrasonic sensor 410 of the sixth embodiment can maintain the high transmitting and receiving sensitivities irrespective of the temperature.

As described above, according to the ultrasonic sensor 410 of the sixth embodiment, the circuit device 20 measures the Young's modulus E of the acoustic matching member 13p by measuring the ambient temperature and calculates the resonance frequency Fc from the equation (5) using the Young's modulus E.

The ambient temperature is measured using the electrodes 41 that are embedded in the first absorber 19. In this way, the ambient temperature is measured without using a special device such as a temperature sensor so that manufacturing cost of the ultrasonic sensor 410 can be reduced.

Alternatively, the ultrasonic sensor 410 can have a temperature sensor located in the housing 31 to measure the ambient temperature.

Seventh Embodiment

Figure 15:
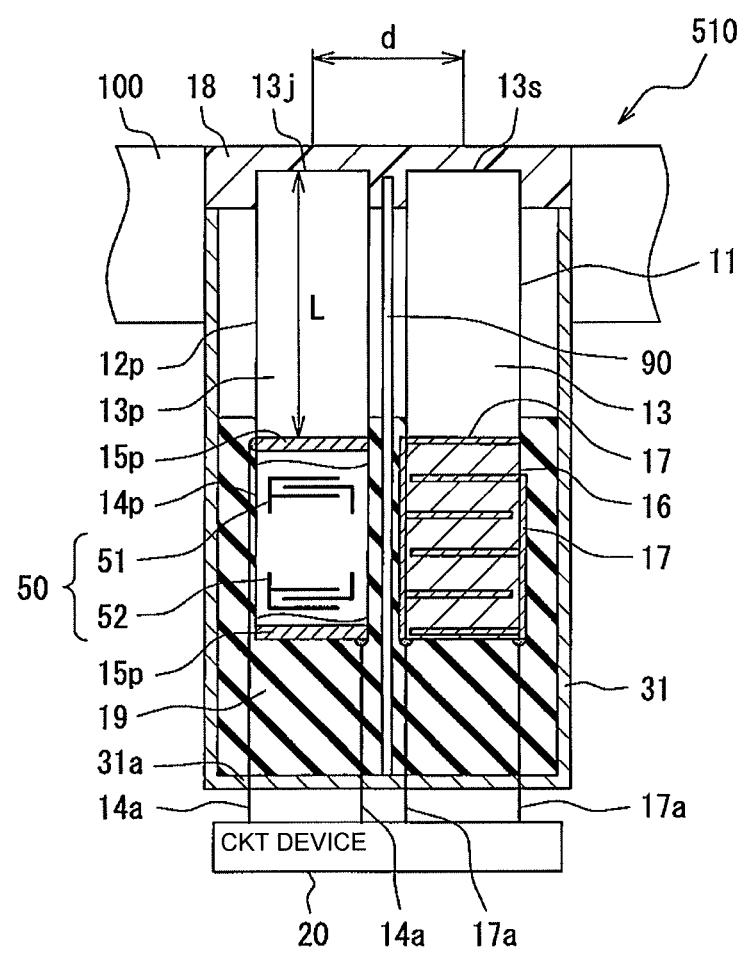
FIG. 15 is a diagram illustrating a cross-sectional view of an ultrasonic sensor according to a seventh embodiment of the present invention.

An ultrasonic sensor 510 according to a seventh embodiment of the present invention is described below with reference to FIG. 15.

A difference between the sixth and the seventh embodiments is as follows.

The ultrasonic sensor 510 includes a surface acoustic wave (SAW) element 50 instead of the electrodes 41 of the ultrasonic sensor 410.

The SAW element 50 includes electrodes 51, 52. As can be seen from FIG. 15, each of the electrodes 51, 52 has a comb shape and attached on a surface of the piezoelectric element 14p. It is noted that the piezoelectric element 14p of FIG. 15 is not a cross-sectional view for explanation purpose. The electrodes 51, 52 are spaced from each other and electrically connected to the circuit device 20 through wires (not shown), respectively.

The SAW element 50 receives a control signal from the circuit device 20 and causes the electrode 51 to emit a surface acoustic wave of a predetermined frequency according to the control signal. The emitted surface acoustic wave propagates along the surface of the piezoelectric element 14p and is received by the electrode 52. The electrode 52 produces an electrical signal corresponding to the received surface acoustic wave.

A frequency adjustment process performed by the circuit device 20 of the ultrasonic sensor 510 is described below with reference to FIG. 14.

The frequency adjustment process starts at S1101, where the circuit device 20 determines whether the vehicle speed D is equal to or less than the ultrasonic detectable speed Do. If the vehicle speed D is equal to or less than the ultrasonic detectable speed Do corresponding to YES at S1101, the frequency adjustment process proceeds to 51103b, where the circuit device 20 performs an ambient temperature measurement process. In the ambient temperature measurement process, the circuit device 20 measures the ambient temperature based on a difference in frequency between the surface acoustic wave emitted by the electrode 51 and the surface acoustic wave received by the electrode 52.

Specifically, since the piezoelectric element 14p expands with an increase in the ambient temperature, the distance between the electrodes 51, 52 of the SAW element 50 increases with the increase in the ambient temperature. Therefore, as the ambient temperature increases, the wavelength of the surface acoustic wave increases during propagation from the electrode 51 to the electrode 52. In other words, the frequency of the surface acoustic wave decreases with the increase in the ambient temperature during propagation from the electrode 51 to the electrode 52.

Thus, the ambient temperature can be measured based on the difference in frequency between the surface acoustic wave emitted by the electrode 51 and the surface acoustic wave received by the electrode 52.

After the ambient temperature is measured at S1103b, the threshold adjustment process proceeds to S1105b, S1107, S1109, S1111, and S1113 in the same manner as in the sixth embodiment. In such an approach, the frequency of the voltage applied to the multilayer piezoelectric element 16 can be kept equal to the resonance frequency Fc despite the fact that the resonance frequency Fc varies with the temperature. Therefore, the ultrasonic sensor 510 of the seventh embodiment can maintain the high transmitting and receiving sensitivities irrespective of the temperature.

As described above, according to the ultrasonic sensor 510 of the seventh embodiment, the SAW element 50 having the electrodes 51, 52 is attached on the surface of the piezoelectric element 14p. The ambient temperature is measured based on the difference in frequency between the surface acoustic wave emitted by the electrode 51 and the surface acoustic wave received by the electrode 52. In such an approach, the ambient temperature is measured without using a special device such as a temperature sensor.

Alternatively, the SAW element can be attached to a surface of a device other than the piezoelectric element 14p to measure the ambient temperature.

Modifications

The embodiments described above can be modified in various ways.

The piezoelectric elements 14p, 16 can be made of a material other than PZT. For example, the piezoelectric elements 14p, 16 can be made of polyvinylidene fluoride (PVDF). In such an approach, a difference in acoustic impedance between the acoustic matching member 13p and the piezoelectric element 14p and a difference in acoustic impedance between the acoustic matching member 13 and the piezoelectric element 16 can be reduced. Thus, attenuation of the ultrasonic wave can be reduced. Further, since PVDF is a kind of resin, the acoustic matching members 13, 13p can be easily formed by an insert molding method.

In the embodiments described above, the receiving surfaces 13j and the transmitting surface 13s are covered with the vibration damper 18 so that the receiving surfaces 13j and the transmitting surface 13s are not exposed to the outside of the housing 31. Alternatively, the vibration damper 18 can be located at side surfaces of the acoustic matching members 13, 13p near the receiving and transmitting surfaces 13j, 13s so that the receiving and transmitting surfaces 13j, 13s can be exposed to the outside of the housing 31. In this case, the exposed surfaces 13j, 13s can be covered with coating material or the like.

The vibration isolator 90 can be integrally formed with the housing 31. That is, the housing 31 and the vibration isolator 90 can be formed as a single piece. In such an approach, while the number of parts of the ultrasonic sensor can be reduced, the vibration isolator 90 can be accurately positioned with respect to the housing 31.

The acoustic matching members 13, 13p can have a shape other than a rectangular cylindrical shape. For example, the acoustic matching members 13, 13p can have a circular cylindrical shape. In such an approach, unwanted vibration in the acoustic matching member 13, 13p can effectively reduced.

The number and arrangement of the transmitting device 11 and the receiving devices 12p-12r can vary depending on the intended use. For example, for distance measurement, the ultrasonic sensor needs at least one transmitting device and at least one receiving device. For angle measurement, the ultrasonic sensor needs at least one transmitting device and at least two receiving devices.

Such changes and modifications are to be understood as being within the scope of the present invention as defined by the appended claims.

What is claimed is:

1. An ultrasonic sensor for detecting an object, comprising:
a transmitting device for transmitting an ultrasonic wave to the object, the transmitting device including a first piezoelectric element configured to emit the ultrasonic wave, the transmitting device further including a first acoustic matching member through which the emitted ultrasonic wave propagates to an outside;
a receiving device for receiving the ultrasonic wave reflected from the object, the receiving device including a second piezoelectric element configured to detect the reflected ultrasonic wave and produce an output voltage corresponding to the detected ultrasonic wave, the receiving device further including a second acoustic matching member through which the reflected ultrasonic wave propagates to the second piezoelectric element; and
a circuit device for applying a voltage to the first piezoelectric element to cause the first piezoelectric element to emit the ultrasonic wave, the circuit device determining that the receiving device receives the reflected ultrasonic wave when the output voltage of the second piezoelectric element is equal to or greater than a first threshold voltage, wherein
the circuit device includes a humidity detection section configured to detect an ambient humidity of the transmitting and receiving devices and a threshold adjustment section configured to calculate, based on the detected ambient humidity, an estimated sound pressure of the ultrasonic wave that is received by the receiving device after propagating over a round-trip distance between the ultrasonic sensor and the object, the threshold adjustment section reducing the first threshold voltage when the output voltage which would be output by the receiving device from reception of the ultrasonic wave when the estimated sound pressure is less than a second threshold voltage,
the second threshold voltage being greater than the first threshold voltage,
the threshold adjustment section calculates the sound pressure of the ultrasonic wave from the following three equations, $$K=1.92\times(Go/G\times H)^{1.3}\times 10^5 \qquad (a),$$

where K is a variable, Go is an atmospheric pressure, G is a saturated vapor pressure, and H is the ambient humidity, $$M=(33+0.2T)F^2\times 10^{-12}+NF/\{K(2\pi F)+(2\pi F)/K\} \qquad (b),$$

where M is an absorption coefficient, T is a temperature, F is a frequency of the ultrasonic wave, and N is a predetermined coefficient, and $$P=Ae^{-MR}/R \qquad (c),$$

where P is the sound pressure, A is a predetermined coefficient, and R is the round-trip distance,
the humidity detection section applies a first detection voltage of a first frequency to the first piezoelectric element for a predetermined time period to cause the first piezoelectric element to emit the ultrasonic wave of the first frequency, the first frequency being slightly less than a resonance frequency of the first matching member,
the humidity detection section calculates a first absorption coefficient from the equation (c) based on the sound pressure, the sound pressure being calculated from an amplitude of the output voltage of the second piezoelectric element that detects the reflected ultrasonic wave of the first frequency,
the humidity detection section applies a second detection voltage of a second frequency to the first piezoelectric element for a predetermined time period to cause the first piezoelectric element to emit the ultrasonic wave of the second frequency, the second frequency being slightly greater than the resonance frequency,
the humidity detection section calculates a second absorption coefficient from the equation (c) based on the sound pressure, the sound pressure being calculated from the amplitude of the output voltage of the second piezoelectric element that detects the reflected ultrasonic wave of the second frequency, the humidity detection section derives a first equation containing the variable K by substituting the first absorption coefficient into the equation (b) and a second equation containing the variable K by substituting the second absorption coefficient into the equation (b), and
the humidity detection section calculates the humidity from the equation (a) and the derived first and second equations.

2. The ultrasonic sensor according to claim 1, wherein the first acoustic matching member is made of resin.

3. The ultrasonic sensor according to claim 1, wherein the first piezoelectric element comprises a plurality of piezoelectric elements stacked together to form a multilayer piezoelectric element.

4. The ultrasonic sensor according to claim 1, wherein the second piezoelectric element is made of piezoelectric zirconate titanate.

5. The ultrasonic sensor according to claim 1, wherein each of the first and second piezoelectric elements is made of polyvinylidene fluoride.

6. The ultrasonic sensor according to claim 1, wherein the receiving device comprises a plurality of receiving devices that are arranged in an array pattern.

7. An ultrasonic sensor for detecting an object, comprising:
a transmitting device for transmitting an ultrasonic wave to the object, the transmitting device including a first piezoelectric element configured to emit the ultrasonic wave, the transmitting device further including a first acoustic matching member through which the emitted ultrasonic wave propagates to an outside;
a receiving device for receiving the ultrasonic wave reflected from the object, the receiving device including a second piezoelectric element configured to detect the reflected ultrasonic wave and produce an output voltage corresponding to the detected ultrasonic wave, the receiving device further including a second acoustic matching member through which the reflected ultrasonic wave propagates to the second piezoelectric element;
a circuit device for applying a voltage to the first piezoelectric element to cause the first piezoelectric element to emit the ultrasonic wave, the circuit device determining that the receiving device receives the reflected ultrasonic wave when the output voltage of the second piezoelectric element is equal to or greater than a first threshold voltage; and
a gelatinous absorber configured to protect at least one of the transmitting and receiving devices from an external force, wherein
the circuit device includes a humidity detection section configured to detect an ambient humidity of the transmitting and receiving devices and a threshold adjustment section configured to calculate, based on the detected ambient humidity, an estimated sound pressure of the ultrasonic wave that is received by the receiving device after propagating over a round-trip distance between the ultrasonic sensor and the object, the threshold adjustment section reducing the first threshold voltage when the output voltage which would be output by the receiving device from reception of the ultrasonic wave when the estimated sound pressure is less than a second threshold voltage,
the second threshold voltage being greater than the first threshold voltage, and
the humidity detection section detects the ambient humidity based on a dielectric constant of the absorber.

8. An ultrasonic sensor for detecting an object, comprising:
a transmitting device for transmitting an ultrasonic wave to the object, the transmitting device including a first piezoelectric element configured to emit the ultrasonic wave, the transmitting device further including a first acoustic matching member through which the emitted ultrasonic wave propagates to an outside;
a receiving device for receiving the ultrasonic wave reflected from the object, the receiving device including a second piezoelectric element configured to detect the reflected ultrasonic wave and produce an output voltage corresponding to the detected ultrasonic wave, the receiving device further including a second acoustic matching member though which the reflected ultrasonic wave propagates to the second piezoelectric element;
a circuit device for applying a voltage to the first piezoelectric element to cause the first piezoelectric element to emit the ultrasonic wave, the circuit device determining that the receiving device receives the reflected ultrasonic wave when the output voltage of the second piezoelectric element is equal to or greater than a first threshold voltage; and
a surface acoustic wave element located on a surface of one of the first and second piezoelectric elements, the surface acoustic wave element emitting a surface acoustic wave and receiving the emitted surface acoustic wave, wherein
the circuit device includes a humidity detection section configured to detect an ambient humidity of the transmitting and receiving devices and a threshold adjustment section configured to calculate, based on the detected ambient humidity, an estimated sound pressure of the ultrasonic wave that is received by the receiving device after propagating over a round-trip distance between the ultrasonic sensor and the object, the threshold adjustment section reducing the first threshold voltage when the output voltage which would be output by the receiving device from reception of the ultrasonic wave when the estimated sound pressure is less than a second threshold voltage,
the second threshold voltage being greater the first threshold voltage, and
the humidity detection section detects the ambient humidity based on a difference in frequency between the emitted surface acoustic wave and the received surface acoustic wave.

* * * * *